(12) United States Patent
Mullenhoff

(10) Patent No.: US 11,308,693 B2
(45) Date of Patent: Apr. 19, 2022

(54) SMART EDGE LOOP SELECTION

(71) Applicant: Lucasfilm Entertainment Company Ltd., San Francisco, CA (US)

(72) Inventor: Colette Mullenhoff, Millbrae, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 16/930,591

(22) Filed: Jul. 16, 2020

(65) Prior Publication Data

US 2021/0407199 A1 Dec. 30, 2021

Related U.S. Application Data

(60) Provisional application No. 63/044,923, filed on Jun. 26, 2020.

(51) Int. Cl.

| | | |
|---|---|---|
| *G06T 17/20* | (2006.01) | |
| *G06F 3/04842* | (2022.01) | |
| *G06F 3/04845* | (2022.01) | |
| *G06T 19/20* | (2011.01) | |

(52) U.S. Cl.
CPC ........ *G06T 17/205* (2013.01); *G06F 3/04842* (2013.01); *G06F 3/04845* (2013.01); *G06T 19/20* (2013.01)

(58) Field of Classification Search
None
See application file for complete search history.

(56) References Cited

U.S. PATENT DOCUMENTS

| | | | | |
|---|---|---|---|---|
| 10,726,621 | B2* | 7/2020 | Bryson | G06T 19/003 |
| 11,188,779 | B2* | 11/2021 | Milis | G06T 5/00 |
| 2004/0249809 | A1* | 12/2004 | Ramani | G06K 9/6892 |
| 2006/0017721 | A1* | 1/2006 | Couture-Gagnon | G06T 17/205 345/419 |
| 2014/0321731 | A1* | 10/2014 | Bryll | G06T 7/136 382/152 |
| 2015/0015577 | A1* | 1/2015 | Mason | G06T 17/30 345/420 |
| 2019/0026941 | A1* | 1/2019 | Bryson | G06T 17/20 |
| 2019/0221034 | A1* | 7/2019 | Mason | G06T 17/205 |
| 2019/0303532 | A1* | 10/2019 | Urick | G06T 17/30 |
| 2020/0134245 | A1* | 4/2020 | Bouvier | G06F 30/12 |

* cited by examiner

*Primary Examiner* — YuJang Tswei
(74) *Attorney, Agent, or Firm* — Kilpatrick Townsend & Stockton LLP

(57) ABSTRACT

A method of edge loop selection includes accessing a polygon mesh; receiving a selection of a first edge connected to a first non-four-way intersection vertex; receiving, after receiving the selection of the first edge, a selection of a second edge connected to the first non-four-way intersection vertex; in response to receiving a command invoking an edge loop selection process: evaluating a topological relationship between the first edge and the second edge; determining a rule for processing a non-four-way intersection vertex based on the topological relationship between the first edge and the second edge; and completing an edge loop by, from the second edge, processing each respective four-way intersection vertex by choosing a middle edge as a next edge at the respective four-way intersection vertex, and processing each respective non-four-way intersection vertex based on the rule.

7 Claims, 19 Drawing Sheets

SMART EDGE LOOP SELECTION

CROSS-REFERENCE TO RELATED APPLICATIONS

The present application claims the benefit and priority under 35 U.S.C. 119(e) of U.S. Application No. 63/044,923, filed on Jun. 26, 2020, entitled "SMART EDGE LOOP SELECTION," the content of which is herein incorporated by reference in its entirety for all purposes.

BACKGROUND

In 3D computer graphics and solid modeling, a polygon mesh is a collection of vertices, edges and faces that defines the shape of a polyhedral object. The faces can include triangles (triangle mesh), quadrilaterals (quads), or other simple polygons (n-gons). An edge loop can refer to a set of connected edges across a surface. In some cases, the last edge meets again with the first edge, thus forming a complete loop. The set of edges can, for example, be the outer edges of a flat surface, or the edges surrounding a hole in a surface. Edge loops are useful in solid modeling, for example, in models that need to be animated, such as in animation film production. For example, in modeling a human face, edge loops can follow the orbicularis oculi muscle around the eyes and the orbicularis oris muscle around the mouth. An edge loop that mimics how real muscles work can provide control over contour and silhouette in any position. Conventional methods of edge loop selection can be tedious and time-consuming for an artist. Thus, there is a need for improved methods of edge loop selection.

SUMMARY

According to some embodiments, a method of edge loop selection in computer graphics performed by a computer system includes accessing a polygon mesh. The polygon mesh includes a plurality of vertices and a plurality of edges associated with the plurality of vertices. The method further includes receiving, via an input device of the computer system, a selection of a first edge connected to a first non-four-way intersection vertex; and receiving, via the input device and after receiving the selection of the first edge, a selection of a second edge connected to the first non-four-way intersection vertex. The method further includes, in response to receiving, via the input device, a command invoking an edge loop selection process: evaluating a topological relationship between the first edge and the second edge; and determining a rule for processing a non-four-way intersection vertex based on the topological relationship between the first edge and the second edge. The method further includes completing an edge loop by, from the second edge and continuing in a direction from the first edge to the second edge: processing each respective four-way intersection vertex by choosing a middle edge as a next edge at the respective four-way intersection vertex; and processing each respective non-four-way intersection vertex based on the rule.

According to some embodiments, a method of edge loop selection in computer graphics performed by a computer system includes accessing a polygon mesh. The polygon mesh includes a plurality of vertices and a plurality of edges associated with the plurality of vertices. The method further includes receiving, via an input device of the computer system, a selection of a first edge connected to a first four-way intersection vertex; and receiving, via the input device and after receiving the selection of the first edge, a selection of a second edge connected to the first four-way intersection vertex. Wherein one edge is skipped from the first edge to the second edge. The method further includes, in response to receiving, via the input device, a command invoking an edge loop selection process, completing an edge loop by, from the second edge and continuing in a direction from the first edge to the second edge: processing each respective four-way intersection vertex by choosing a middle edge as a next edge at the respective four-way intersection vertex; and processing each respective non-four-way intersection vertex based on a default rule.

According to some embodiments, a method of edge loop selection in computer graphics performed by a computer system includes accessing a polygon mesh. The polygon mesh includes a plurality of vertices and a plurality of edges associated with the plurality of vertices. The method further includes, receiving, via an input device of the computer system, a selection of a first edge connected to a first vertex; and receiving, via the input device and after receiving the selection of the first edge, a selection of a second edge connected to the first vertex. The method further includes, in response to receiving, via the input device, a command invoking an edge loop selection process: evaluating a topological relationship between the first edge and the second edge; determining a rule for processing future vertices based on the topological relationship between the first edge and the second edge; and selecting the edge loop by proceeding from the second edge and continuing in a direction from the first edge to the second edge based on the rule.

According to some embodiments, a computer product includes a non-transitory computer readable medium storing a plurality of instructions that, when executed, control a computer system to select an edge loop. The instructions include accessing a polygon mesh. The polygon mesh includes a plurality of vertices and a plurality of edges associated with the plurality of vertices. The instructions further include receiving, via an input device of the computer system, a selection of a first edge connected to a first vertex; and receiving, via the input device and after receiving the selection of the first edge, a selection of a second edge connected to the first vertex. The instructions further include, in response to receiving, via the input device, a command invoking an edge loop selection process: evaluating a topological relationship between the first edge and the second edge; determining a rule for processing future vertices based on the topological relationship between the first edge and the second edge; and selecting the edge loop by proceeding from the second edge and continuing in a direction from the first edge to the second edge based on the rule.

DETAILED DESCRIPTION

Figure 1A:
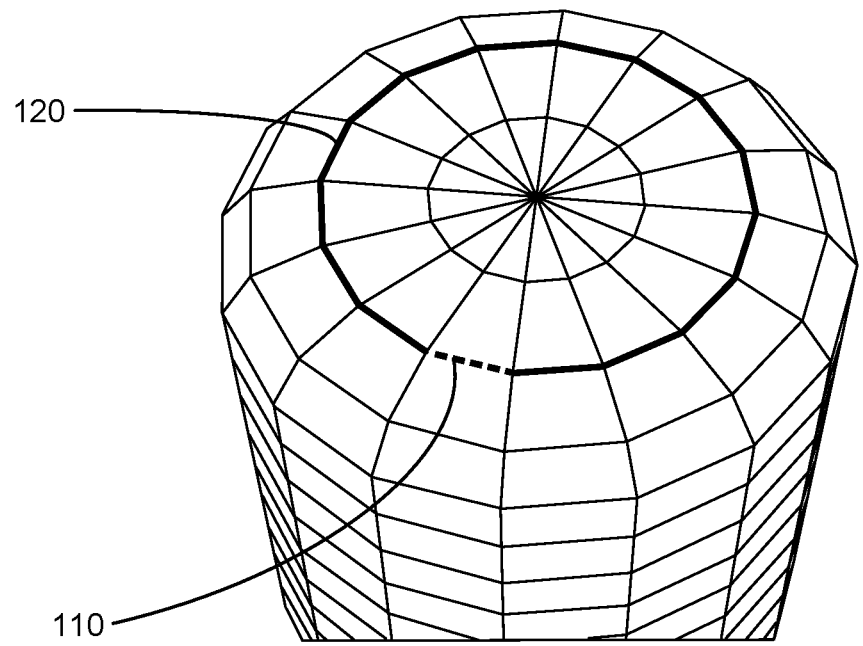
FIG. 1A illustrates an example of an edge loop.

FIG. 1A illustrates an example of an edge loop 120 that includes a set of connected edges 110. One way of selecting an edge loop is to select each individual edge in the edge loop. This can be quite time consuming if an edge loop includes a rather large number of edges. Another way of selecting an edge loop is to select one edge in the desired edge loop, and send a command to invoke an edge loop selection algorithm. The edge loop selection algorithm can automatically complete the edge loop based on the selected edge. For example, by double-clicking an edge, an edge loop selection algorithm can automatically proceed to complete the edge loop by following the middle edge at every four-way intersection. The term "four-way intersection vertex" can refer herein to a vertex that has four edges connected thereto. Four-way intersections can also be referred to as standard intersections.

Figure 1B:
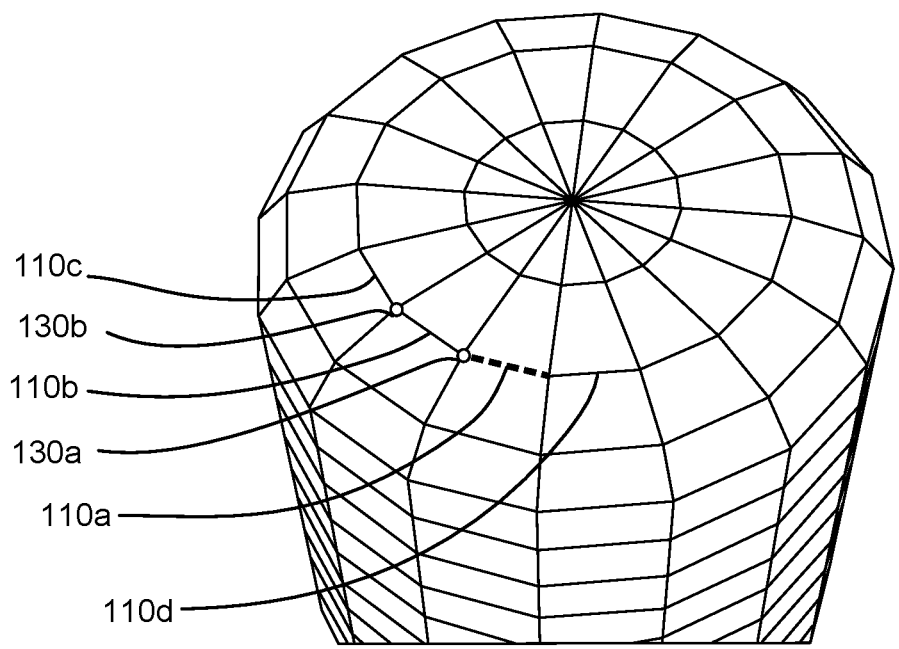
FIG. 1B illustrates an example of how an edge loop selection algorithm can select an edge loop.

FIG. 1B illustrates an example of how an edge loop selection algorithm can select an edge loop. The vertex 130a is a four-way intersection. By double-clicking the edge 110a, the edge loop selection algorithm can "walk" in either direction from the selected edge 110a by following the middle edge at each four-way intersection. For example, walking from the edge 110a toward the left, since the vertex 130a is a four-way intersection vertex, the edge loop selection algorithm would select the middle edge 110b as the next edge (e.g., by skipping one edge). Keep walking towards the left, the next encountered vertex 130b is also a four-way intersection vertex. Thus, again, the edge loop selection algorithm selects the middle edge 110c as the next edge. The edge loop selection algorithm can continue walking in this fashion until the last edge 110d meets the first edge 110a, thus completing the edge loop 120 illustrated in FIG. 1A.

Figure 2:
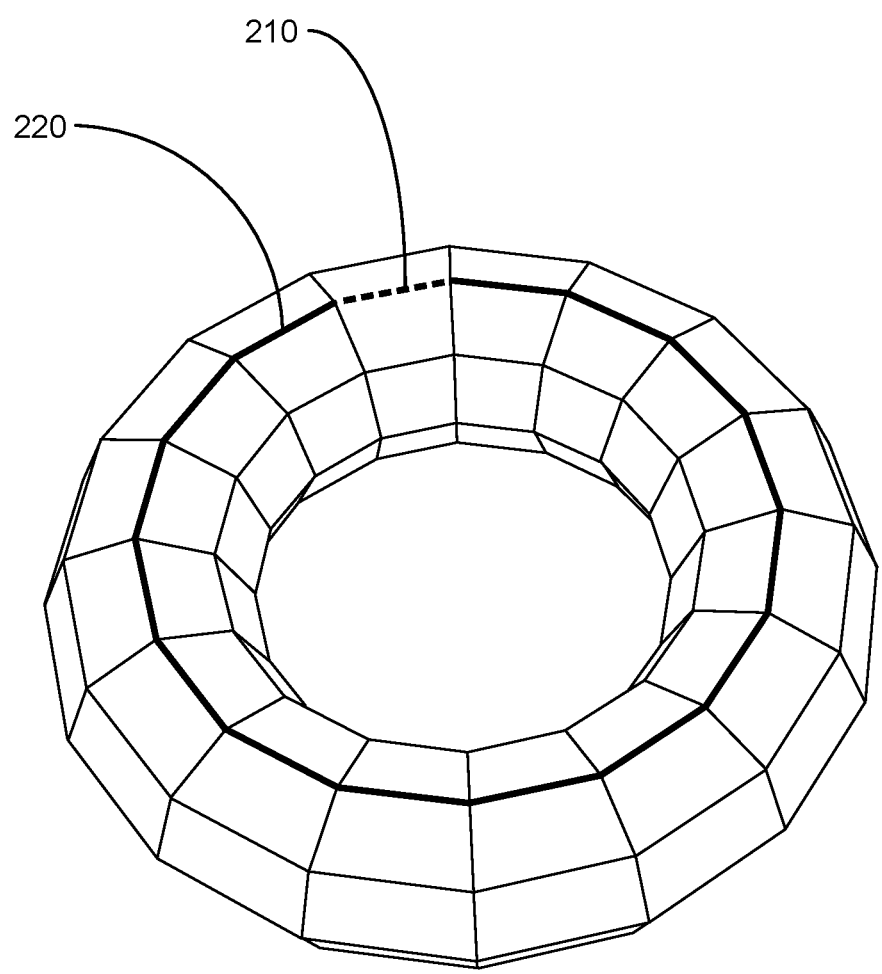
FIG. 2 illustrates another example of how an edge loop selection algorithm can select an edge loop.
Figure 3A:
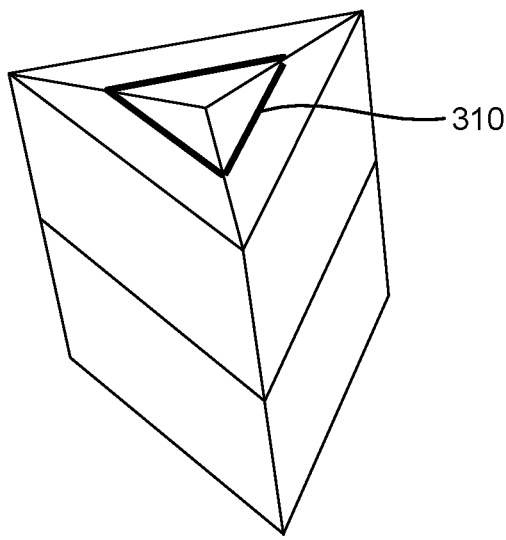
FIGS. 3A-3C illustrate some more examples of how an edge loop selection algorithm can select edge loops.
Figure 3B:
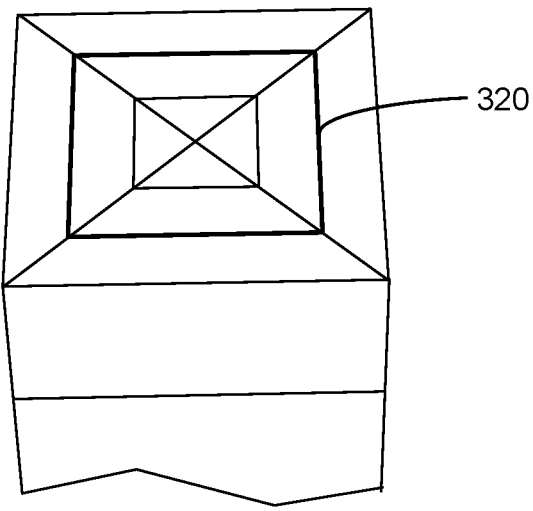
Figure 3C:
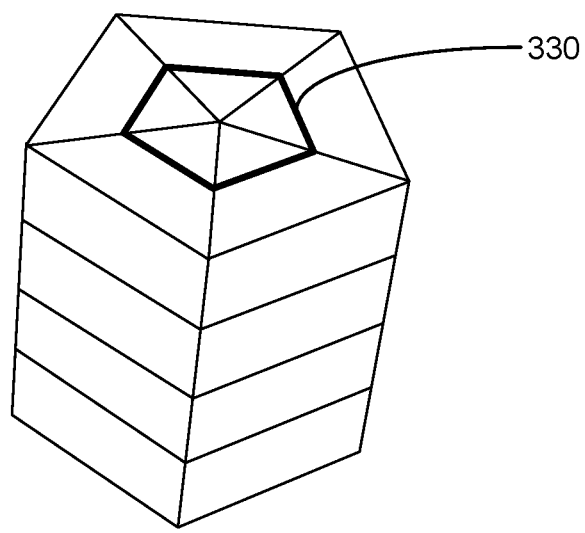

FIG. 2 illustrates another example of how an edge loop selection algorithm can select an edge loop. In this example, the polygon mesh has a toroidal topology. To achieve the edge loop 220, an artist can double-click the edge 210 (or any other edge along the edge loop 220), and an edge loop selection algorithm can complete the edge loop 220 by choosing the middle edge as the next edge at each four-way intersection. FIGS. 3A-3C illustrate some more examples of how an edge loop selection algorithm can select an edge loop. The edge loops 310, 320, and 330 in each example, respectively, can be obtained in a similar fashion. Note that, in each of the examples illustrated in FIGS. 1A-1B, 2, and 3A-3C, the edge loop encounters only standard four-way intersections.

An edge loop selection algorithm can continue to follow the middle edge until it encounters a non-four-way intersection. The term "non-four-way intersection vertex" can refer herein to a vertex that has a number of edges connected thereto that is other than four. For example, a three-way intersection vertex has three edges connected thereto, a five-way intersection vertex has five edges connected thereto, and the like. Non-four-way intersections can also be referred to herein as non-standard intersections.

Figure 4A:
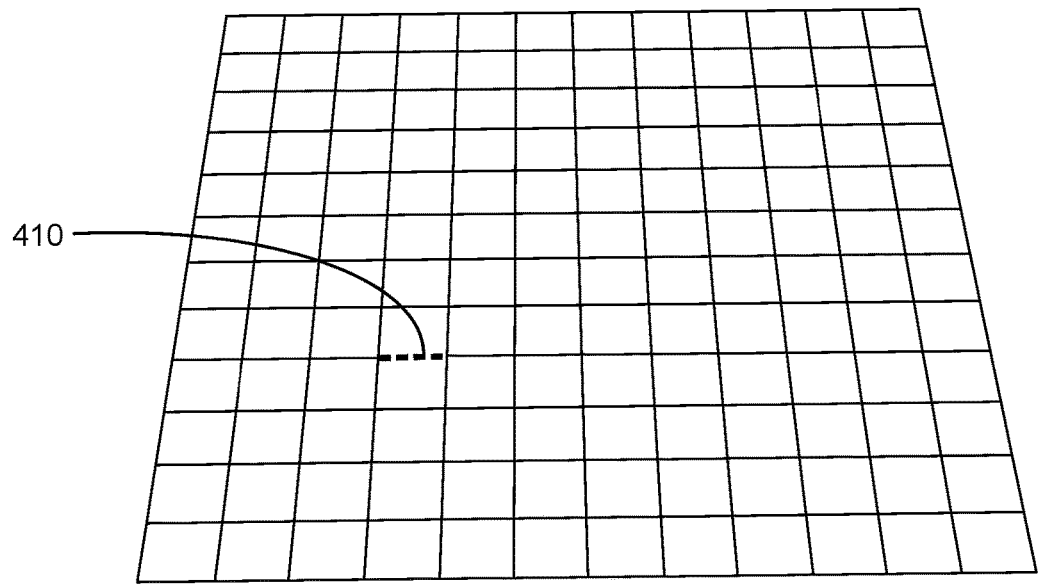
FIGS. 4A and 4B illustrate an example of edge loop selection when non-four-way intersections are involved.
Figure 4B:
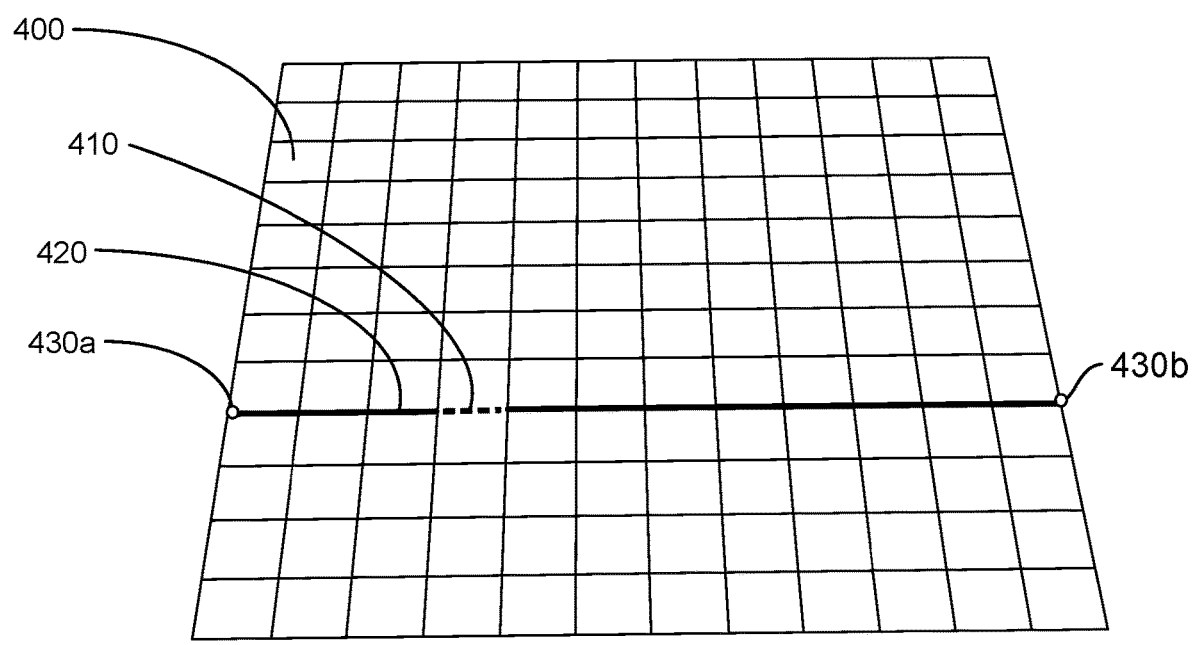

FIGS. 4A and 4B illustrate an example of edge loop selection when non-four-way intersections are involved. By double-clicking on an edge 410, an edge loop selection algorithm can walk toward the left from the edge 410, choosing the middle edge as the next edge at each four-way intersection until it encounters the vertex 430a, which is a three-way intersection. Similarly, it can walk toward the right from the edge 410, choosing the middle edge as the next edge at each four-way intersection until it encounters the vertex 430b, which is also a three-way intersection. In this example, the final edge loop 420 stops at the boundary of the surface 400 at both ends.

Figure 5A:
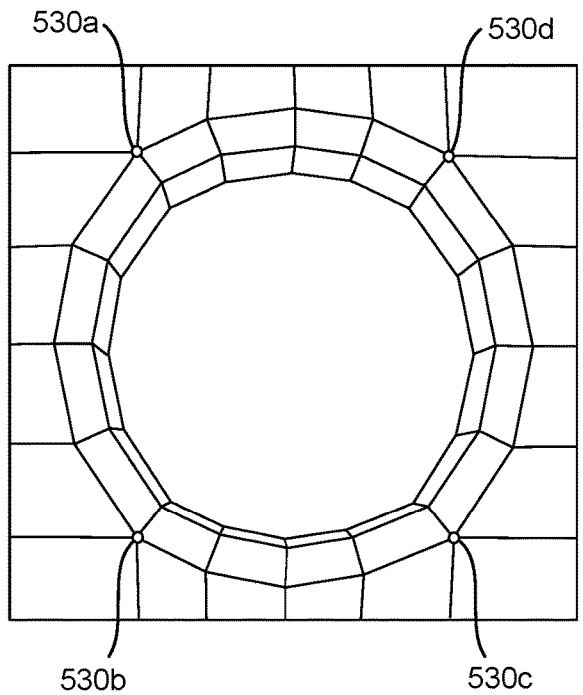
FIGS. 5A-5D illustrate examples of conventional edge loop selections when non-four-way intersections are involved.
Figure 5B:
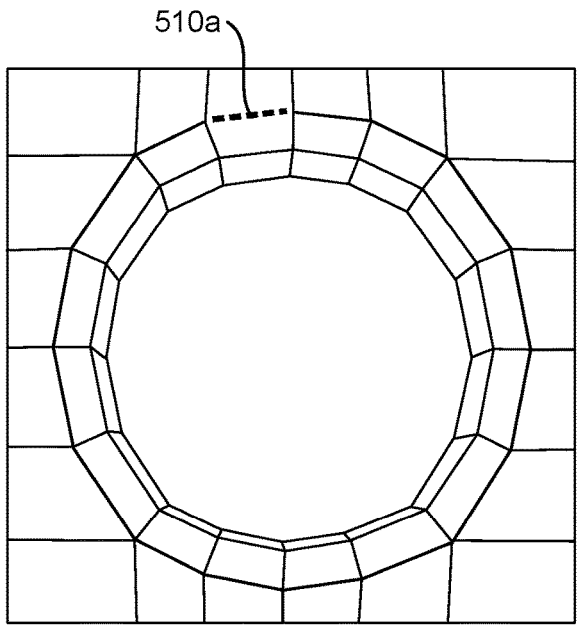
Figure 5C:
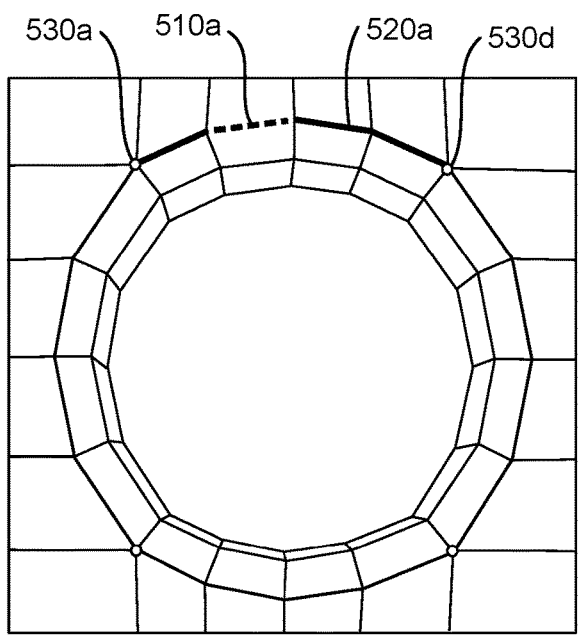
Figure 5D:
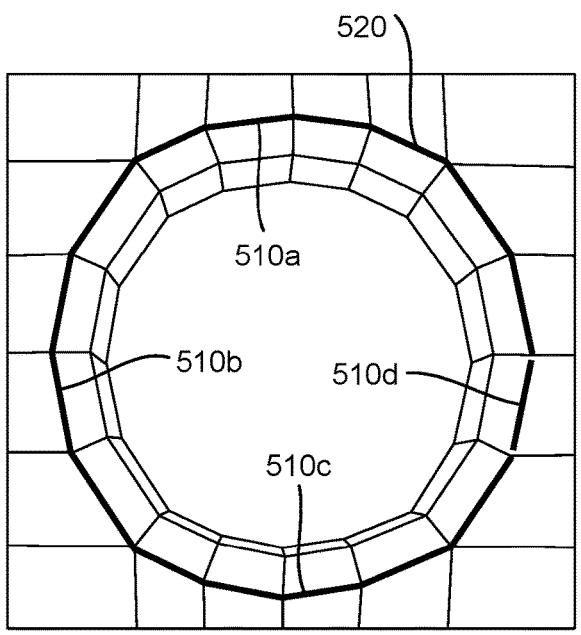

FIGS. 5A-5D illustrate examples of conventional edge loop selections when non-four-way intersections are involved. In this example, the desired edge loop 520 is indicated in FIG. 5D. This edge loop 520 encounters four non-four-way intersection vertices 530a, 530b, 530c, and 530d, as indicated in FIG. 5A. Each of these non-four-way intersection vertices is a five-way intersection vertex. By double-clicking the edge 510a as indicated in FIG. 5B, an edge loop selection algorithm can walk toward the left, choosing the middle edge at each four-way intersection and stopping at the five-way intersection vertex 530a, as illustrated in FIG. 5C. Similarly, the edge loop selection algorithm can walk toward the right, choosing the middle edge at each four-way intersection and stopping at the five-way intersection vertex 530d, thereby completing one section 520a of the desired final edge loop 520. To complete the entire final edge loop 520, an artist may need to make four double-clicks on four edges, one on each of the four sections (e.g., double-clicks on the edges 510a, 510b, 510c, and 510d, as indicated in FIG. 5D).

Figure 6A:
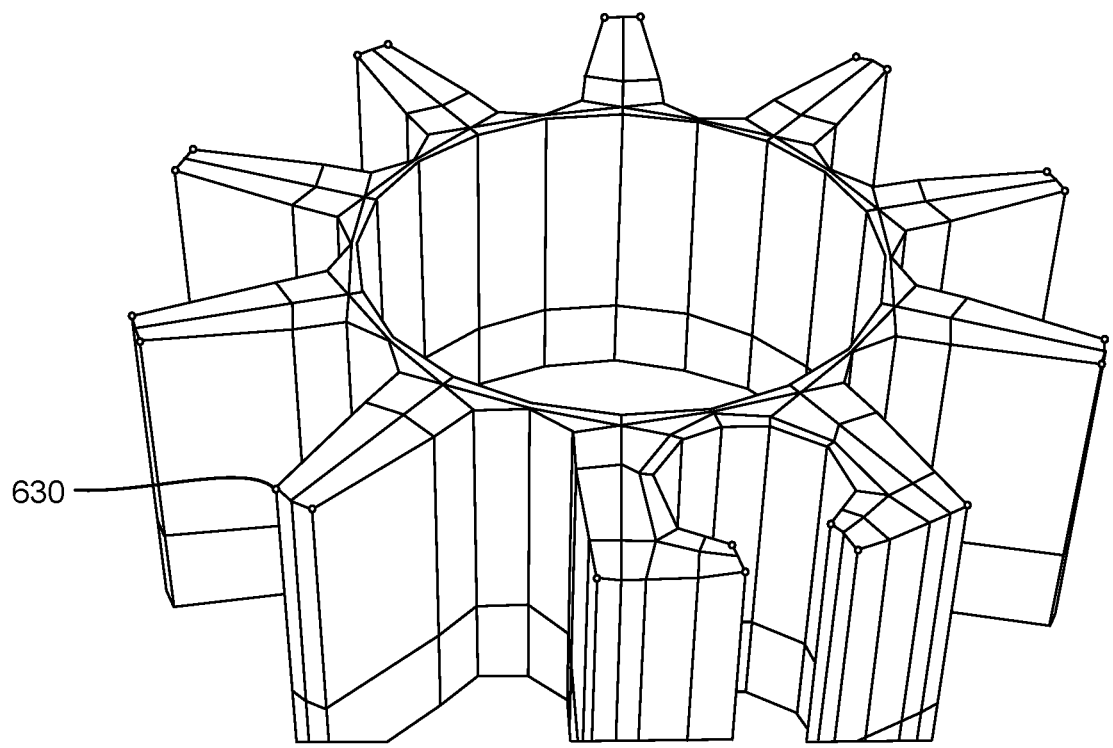
FIGS. 6A and 6B illustrate examples of conventional edge loop selections that involve a more complicated topology.
Figure 6B:
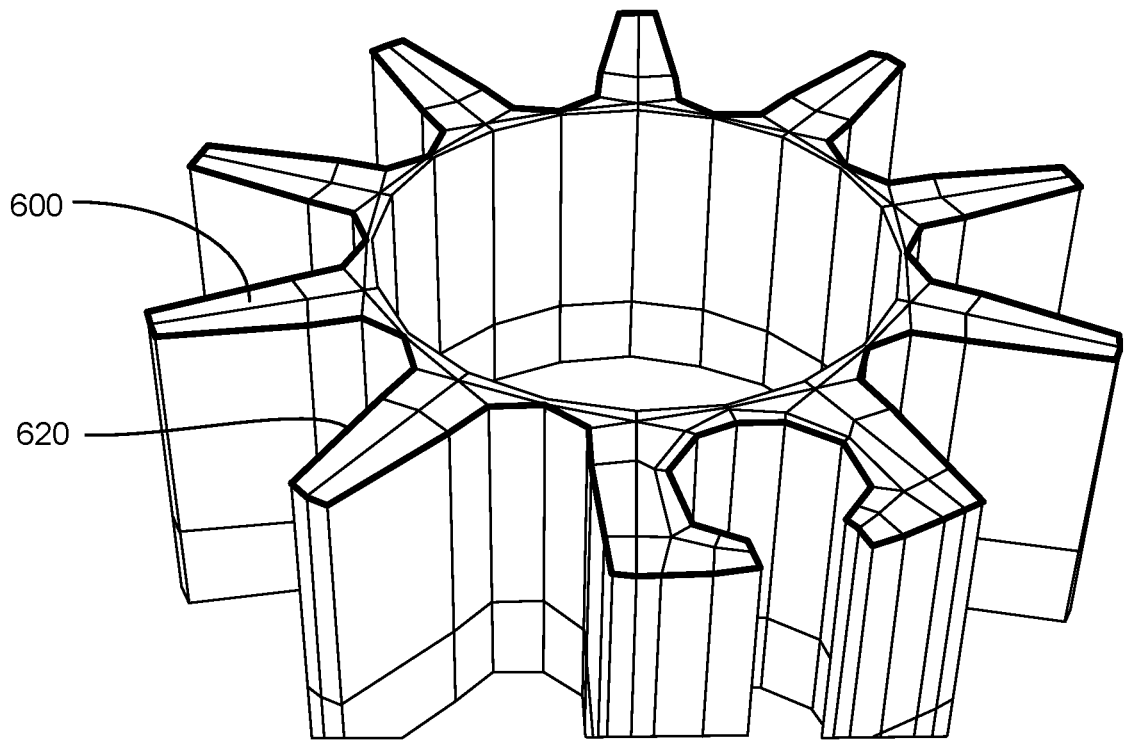

Thus, conventional edge loop selection algorithms described above can require a rather large number of double-clicks (or other types of commands) to complete an edge loop selection for a more complicated mesh topology. FIGS. 6A and 6B illustrate examples of conventional edge loop selections that involve a more complicated topology. The thick line 620 in FIG. 6B indicates the desired edge loop. This edge loop 620 includes 94 edges along the outer edge of the top surface 600 of the polygon mesh. It encounters twenty two (22) non-four-way intersection vertices 630, each of which is a three-way intersection vertex, as indicated in FIG. 6A. The rest of vertices are four-way intersection vertices. Thus, to select the edge loop 620 illustrated in FIG. 6B, an artist can need to either select each of the 94 edges individually; or "double-click" on 22 edges, one for each of the twenty two sections of the edge loop 620, wherein each section includes the set of connected edges between two adjacent non-four-way intersection vertices. Making 94 edge selections or making 22 double-clicks can be a slow and tedious process for artists.

According to some embodiments, smart edge loop selection algorithms can enable an artist to quickly select an edge loop by selecting two edges connected by a non-four-way intersection vertex. The topological relationship between the two selected edges can provide a "hint" to a smart edge loop selection algorithm as how to process future non-four-way intersection vertices. The examples below illustrate how smart edge loop selection algorithms can work according to some embodiments.

Figure 7A:
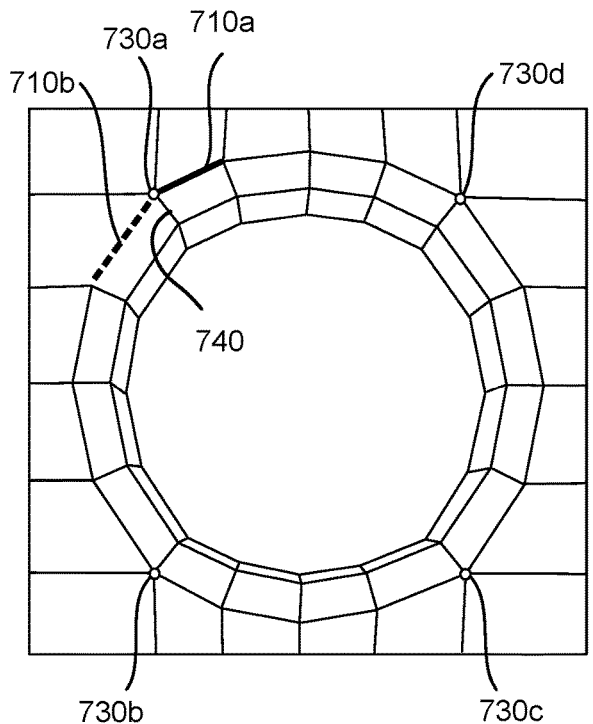
FIGS. 7A-7D illustrate a smart edge loop selection for the same polygon mesh illustrated in FIGS. 5A-5D according to some embodiments.

FIGS. 7A-7D illustrate a smart edge loop selection algorithm for the same polygon mesh illustrated in FIGS. 5A-5D according to some embodiments. Here, an artist wishes to select the edge loop 720 illustrated in FIG. 7D, which is the same as the edge loop 520 illustrated in FIG. 5D. As discussed above, the edge loop 520 encounters four non-four-way intersection vertices 730a-730d (in this example, they are all five-way intersection vertices). The smart edge loop selection algorithm can accept two edges as input. For example, the artist can select a first edge 710a connected to the non-four-way intersection vertex 730a, then a second edge 710b that is also connected to the non-four-way intersection vertex 730a, as illustrated in FIG. 7A. With those two adjacent edges, an input device command can invoke the smart edge loop selection algorithm. The resulting edge loop is then selected and displayed to the artist.

In some embodiments, the smart edge loop selection algorithm can be invoked by double-clicking the second edge 710b. Additionally or alternatively, the smart edge loop selection algorithm can be invoked by using a pull-down menu, or by hovering a mouse over the second edge 710b and selecting an option in a pop-up menu, or by holding a certain key combination (e.g., typing a letter key or a special function key while holding down the Ctrl key or the Alt key), or by a combination of mouse-clicking and key-holding, or by sending other types of commands via input devices. The input devices can include a keyboard, a mouse, a stylus pen, and the like. One of ordinary skill in the art would recognize many variations, alternatives, and modifications.

Once the smart edge loop selection algorithm is invoked, the algorithm can first evaluate the topological relationship between the two initial edges for a "hint" as how to proceed when encountering future non-four-way intersection vertices. For instance, in the example illustrated in FIGS. 7A-7D, the smart edge loop selection algorithm can determine that, "walking" from the first edge 710a to the second edge 710b, one edge 740 on the left side is skipped. This topological relationship provides a "hint" that, when encountering a next non-four-way intersection vertex (e.g., the five-way vertex 730b), the smart edge loop selection algorithm would select a next edge by skipping one edge on the left side.

Figure 7B:
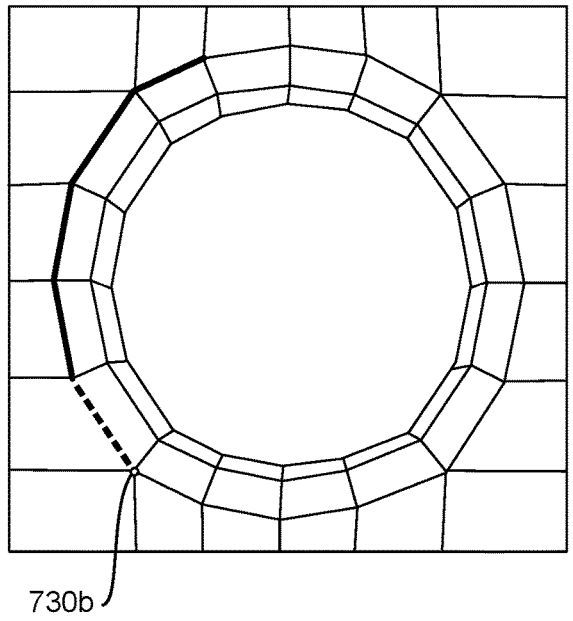
Figure 7C:
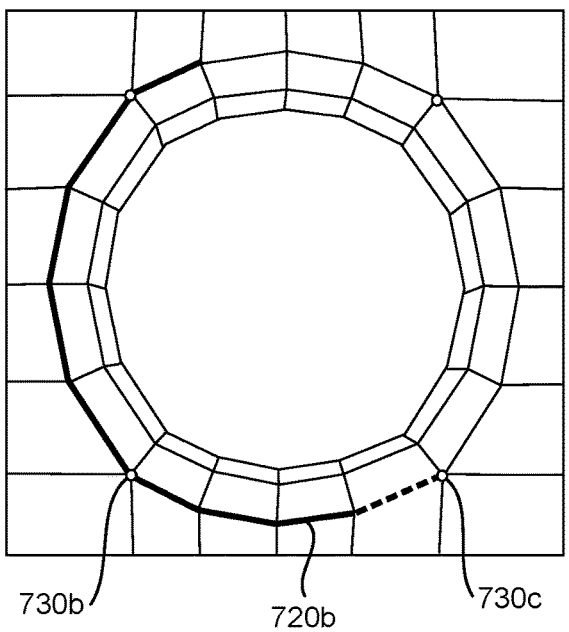
Figure 7D:
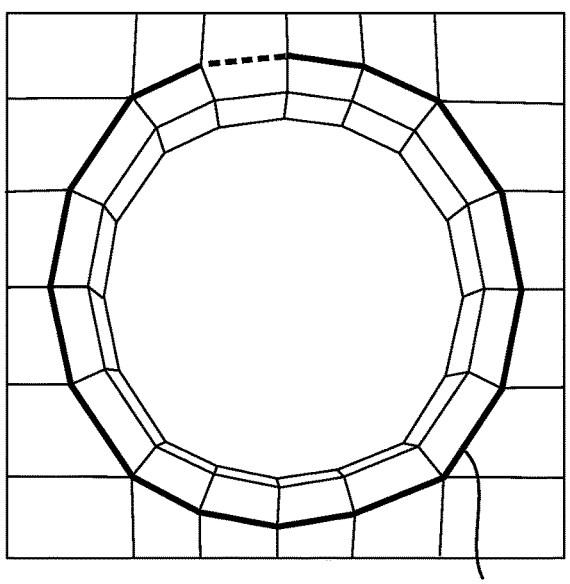

The smart edge loop selection algorithm can then proceed to complete the edge loop as the following: from the second selected edge 710b, it would process each four-way intersection vertex by choosing the middle edge until it encounters a non-four-way intersection vertex; then it would process the non-four-way intersection vertex based on the hint; and then continue in this fashion until the entire edge loop is completed. For instance, in the example illustrated in FIGS. 7A-7D, from the second selected edge 710b, the algorithm would process the four-way intersection vertices by choosing the middle edge at each of them, until it next encounters the non-four-way intersection vertex 730b, as illustrated in FIG. 7B. At that point, based on the hint, the algorithm would process the five-way intersection vertex 730b by skipping one edge on the left side. The algorithm would then continue through the four-way intersection vertices until it next encounters the non-four-way intersection vertex 730c, as illustrated in FIG. 7C. Again based on the hint, the algorithm would process the five-way intersection vertex 730c by skipping one edge on the left side. The algorithm would continue in this fashion until it meets the first edge 710a to complete the entire edge loop 720, as illustrated in FIG. 7D.

Thus, using the smart edge loop selection algorithm, an artist only needs to select two edges and invoke the smart edge loop selection algorithm in order to complete the entire edge loop 720. In comparison, to achieve the same edge loop, conventional edge loop selection methods can require as many as 16 individual edge selections, or four double-clicks, as discussed above with reference to FIGS. 5A-5D. Thus, the smart edge loop selection algorithm can enable artists to select edge loops more efficiently, and thereby improving the speed of content production.

As described above, the smart edge loop selection algorithm obtains the hint as how to process a non-four-way intersection vertex by evaluating the topological relationship between the two selected edges. In some embodiments, the order of the selection of the two edges can matter, so that the algorithm knows in which direction to walk the topology. For instance, in the example illustrated in FIGS. 7A-7D, if the first edge being selected is the edge 710b and the second edge being selected is the edge 710a, the algorithm can walk from the second selected edge 710a in the same direction as going from the first selected edge 710b to the second selected edge 710a (e.g., keep walking to the right). In this example, however, the same edge loop 720 will be achieved by walking in either direction.

Figure 8A:
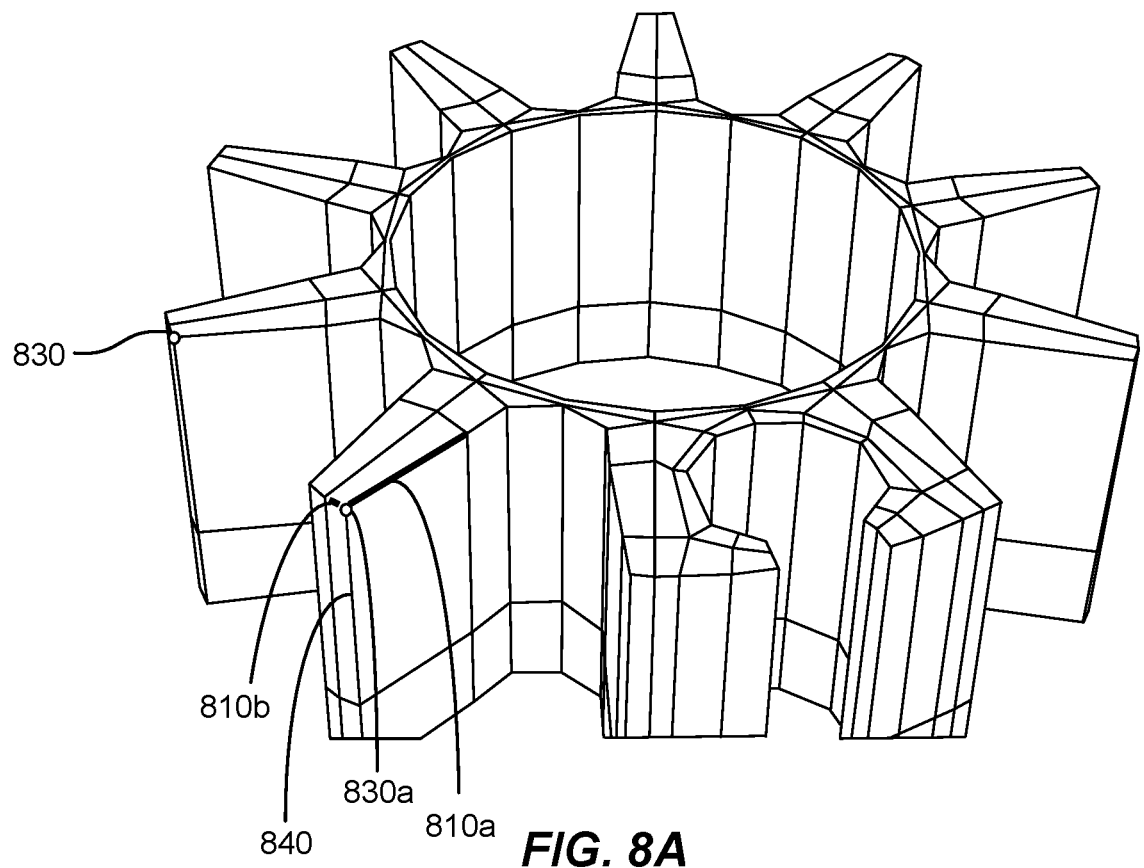
FIGS. 8A and 8B illustrate another example of smart edge loop selection for the same polygon mesh illustrated in FIGS. 6A and 6B according to some embodiments.
Figure 8B:
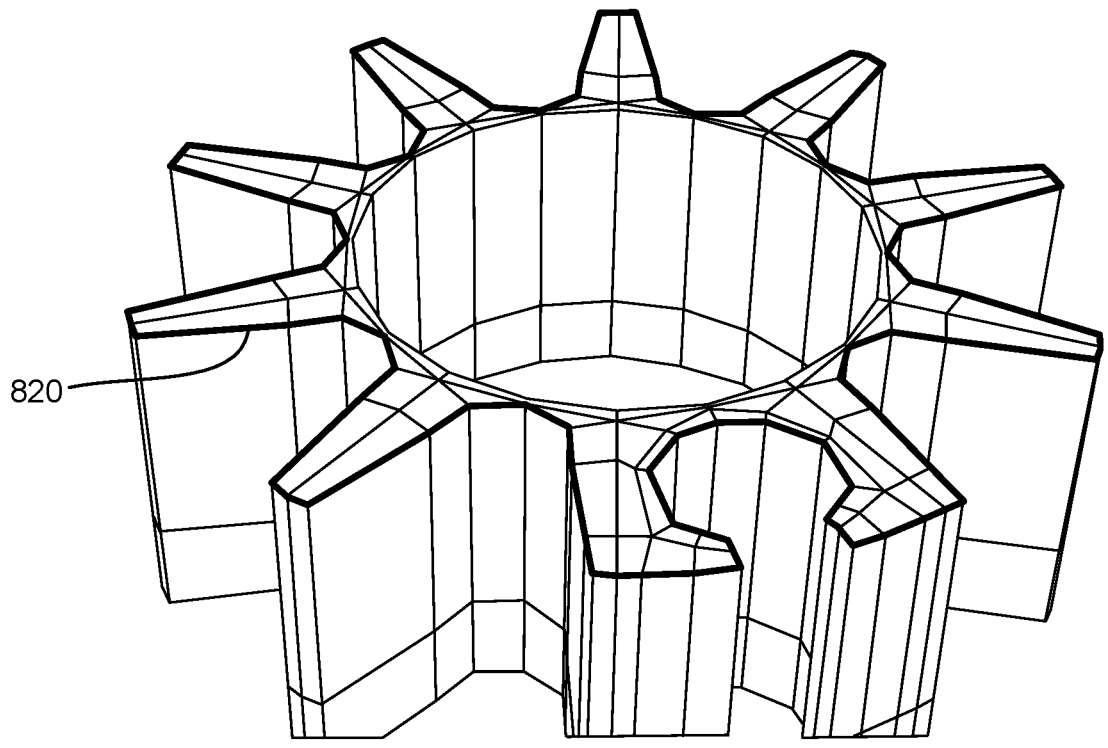

FIGS. 8A and 8B illustrate another example of smart edge loop selection for the same polygon mesh illustrated in FIGS. 6A and 6B according to some embodiments. Here, an artist wishes to select the edge loop 820 illustrated in FIG. 8B, which is the same as the edge loop 620 illustrated in FIG. 6B. As discussed above, the edge loop 820 includes 94 edges, and encounters 22 non-four-way intersection vertices 830 (each of which are three-way intersection vertex). The rest of vertices are four-way intersection vertices. The smart edge loop selection algorithm accepts two edges as input to determine how to process a non-four-way intersection vertex. In this case, there can be several different ways an artist can select two edges connected by a non-four-way intersection vertex to invoke the smart edge loop selection algorithm to achieve the edge loop 820.

FIG. 8A illustrates one of the possible ways of selecting two-edge combinations as input to the smart edge loop selection algorithm. In this example, the first edge being selected is the edge 810a connected to the three-way intersection vertex 830a; and the second edge being selected is the edge 810b also connected to the three-way intersection vertex 830a. Once the smart edge loop selection algorithm is invoked (e.g., by double-clicking the second edge 810b or other methods), the algorithm first evaluates the topological relationship between the first edge 810a and the second edge 810b to determine the hint provided by the artist as how to proceed through a non-four-way intersection vertex. Here, walking from the first edge 810a to the second edge 810b, the edge 840 on the left side is skipped. Thus, the smart edge loop selection algorithm would proceed to complete the edge loop according to the following rules: processing each four-way intersection vertex by choosing the middle edge; and processing each non-four-way intersection vertex by skipping one edge on the left side. The algorithm can continue in this fashion until it meets the first edge 810a to complete the entire edge loop 820, as illustrated in FIG. 8B. For this example, the order of how the two edges 810a and 810b are selected will not make a difference to the final edge loop achieved.

Thus, in this example, an artist can achieve the edge loop 820 by selecting only two edges. In comparison, traditional edge loop selection methods can require as many as 94 individual edge selections, or 22 double-clicks, as discussed above with reference to FIGS. 6A and 6B. This example illustrates that, for more complicated mesh topologies, the smart edge loop selection algorithm can afford significant time savings for artists.

Figure 9A:
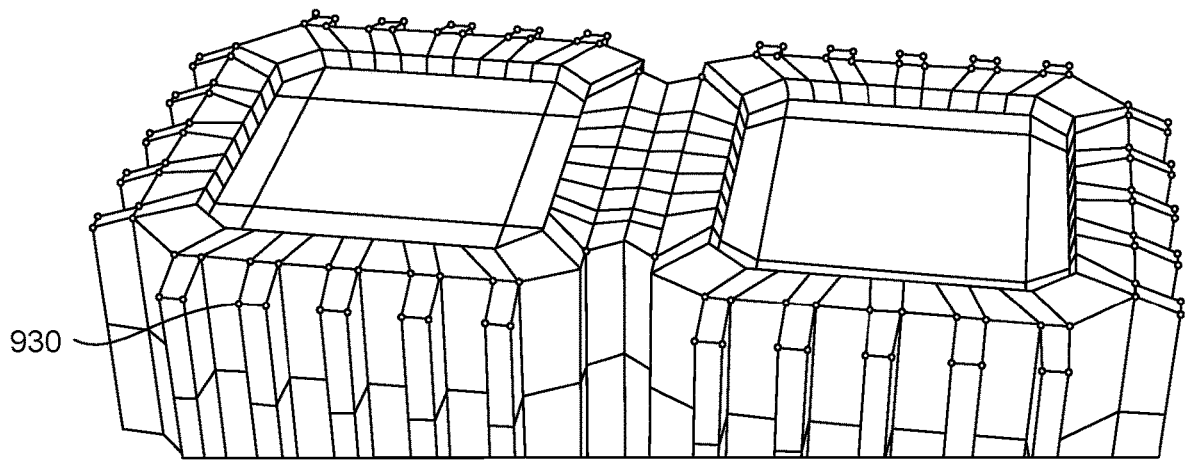
FIGS. 9A-9C illustrate another example of smart edge loop selection with a relatively complex mesh topology according to some embodiments.
Figure 9B:
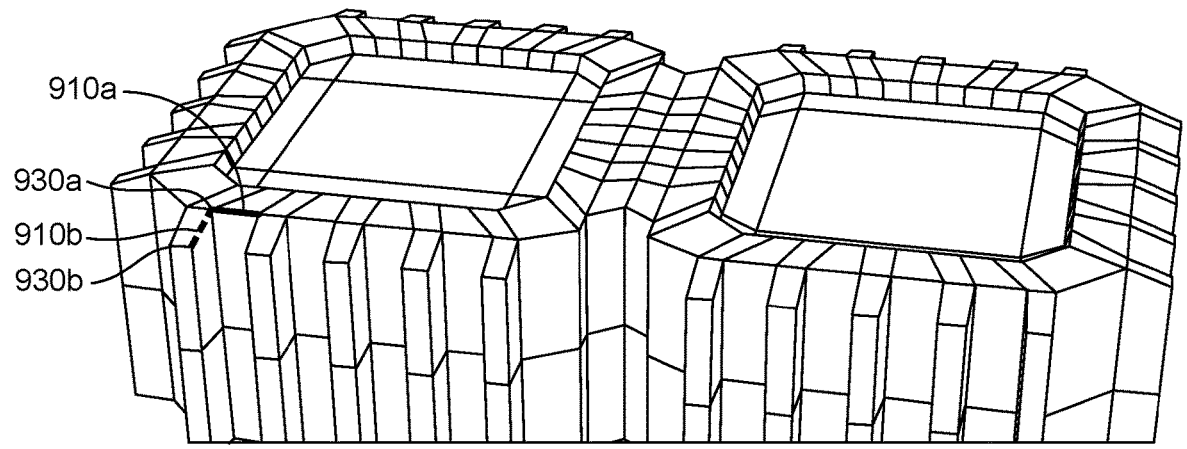
Figure 9C:
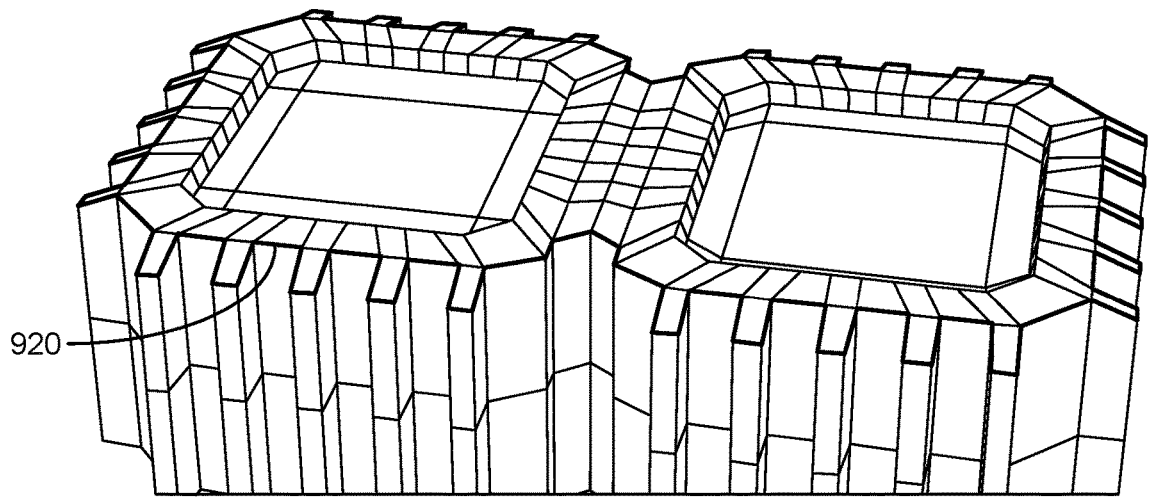

FIGS. 9A-9C illustrate another example of smart edge loop selection with a relatively complex mesh topology according to some embodiments. An artist wishes to select the edge loop 920 illustrated in FIG. 9C. The edge loop 920 includes one hundred thirty (130) edges, and encounters one hundred twenty four (124) non-four-way intersection vertices 930, as illustrated in FIG. 9A. Some of the non-four-way intersection vertices are three-way intersection vertices; and some of them are five-way intersection vertices. In this example, there can be several different ways of selecting two edges connected by a non-four-way intersection vertex as input to the smart edge loop selection algorithm. FIG. 9B shows one example. Here, the first edge being selected is the edge 910a connected to the five-way intersection vertex 930a; and the second edge being selected is the edge 910b connected to the same five-way intersection vertex 930a. Walking from the first edge 910a to the second edge 910b, an edge on the left side is skipped. Thus, the smart edge loop selection algorithm would follow a rule according to the hint by skipping one edge on the left side when it next encounters a non-four-way intersection vertex. Therefore, the entire edge loop 920 illustrated in FIG. 9C can be achieved by selecting only two edges. Compared to one hundred and thirty (130) individual edge selections or one hundred and twenty four (124) double-clicks that would be required using conventional methods, the smart edge loop selection algorithm affords much better efficiency.

Note that, in this example, the smart edge loop selection algorithm can follow the same rule regardless of whether the future non-four-way intersection vertex is a five-way intersection vertex or a three-way intersection vertex. For example, when it encounters the three-way intersection vertex 930b, it also skips one edge on the left side, despite the fact that the non-four-way intersection vertex 930a to which the initial two edges 910a and 910b are connected is a five-way intersection vertex. Also, in this case, the order in which the two edges 910a and 910b are selected would not make a difference to the final edge loop achieved.

In some embodiments, if the two initial edges are connected to each other by a vertex that has five or more edges connected thereto (e.g., 5 edges, 6 edges, 7 edges, etc.), and the rule according to the hint provided by the two initial edges is such that one edge is skipped on the left side (or on the right side), the smart edge loop selection algorithm would process all future non-four-way intersection vertices in the same way by skipping one edge on the left side (or on the right side). For example, assume that the two initial edges are connected to each other by a five-way intersection vertex, and the hint is such that one edge on the left side is skipped. The smart edge loop selection algorithm would skip one edge on the left side when encountering any future five-way intersection vertices, as well as any future three-way intersection vertices and any future six-way intersection vertices, etc.

In some embodiments, if the two initial edges are connected to each other by a vertex that has an odd number of edges connected thereto (e.g., 3 edges, 5 edges, 7 edges, etc.), and the rule according to the hint provided by the two initial edges is such that no edge (i.e., zero edge) is skipped on the left side (or the right side), the smart edge loop selection algorithm would process all future non-four-way intersection vertices in the same way by skipping no edge on the left side (or on the right side).

In some embodiments, if the two edges initially selected are connected to each other by a vertex that has an even number of edges connected thereto, where the even number is equal to or greater than four (e.g., 4 edges, 6 edges, 8 edges, etc.; note that this includes standard four-way intersection vertices), and the rule according to the hint provided by the two initial edges is such that no edge is skipped on the left side (or on the right side), the smart edge loop selection algorithm would process all future intersection vertices (including standard four-way intersection vertices) in the same way by skipping no edge on the left side (or on the right side).

Figure 10:
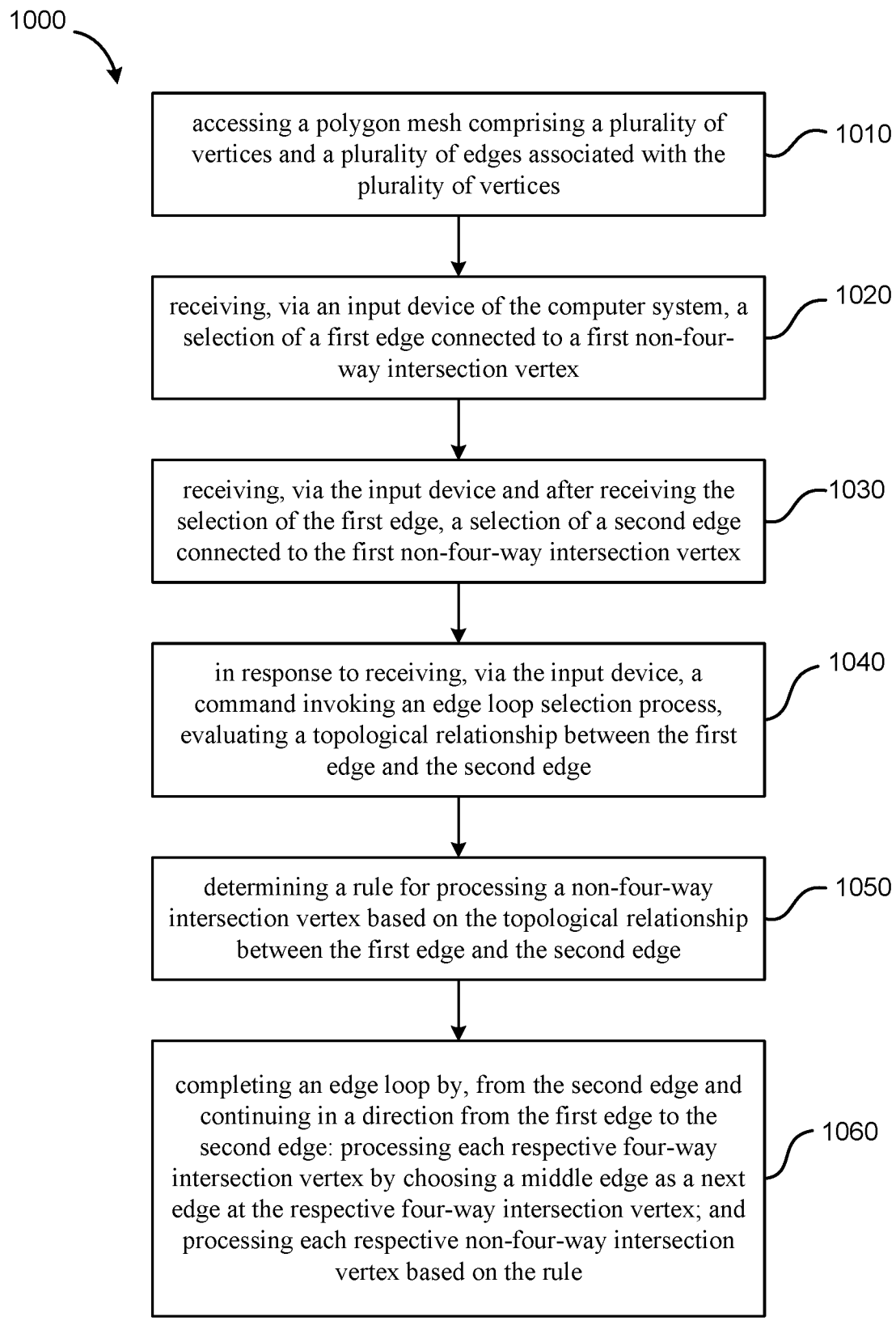
FIG. 10 shows a simplified flowchart illustrating a method of edge loop selection according to some embodiments.

FIG. 10 shows a simplified flowchart illustrating a method 1000 of edge loop selection in computer graphics performed by a computer system according to some embodiments.

The method 1000 includes, at 1010, accessing a polygon mesh. The polygon mesh includes a plurality of vertices and a plurality of edges associated with the plurality of vertices.

The method 1000 further includes, at 1020, receiving, via an input device of the computer system, a selection of a first edge connected to a first non-four-way intersection vertex; and at 1030, receiving, via the input device and after receiving the selection of the first edge, a selection of a second edge connected to the first non-four-way intersection vertex.

The method 1000 further includes, in response to receiving, at 1040, via the input device, a command invoking an edge loop selection process: evaluating a topological relationship between the first edge and the second edge; and at 1050, determining a rule for processing a non-four-way intersection vertex based on the topological relationship between the first edge and the second edge.

The method 1000 further includes, at 1060, completing an edge loop by, from the second edge and continuing in a direction from the first edge to the second edge: processing each respective four-way intersection vertex by choosing a middle edge as a next edge at the respective four-way intersection vertex; and processing each respective non-four-way intersection vertex based on the rule.

It should be appreciated that the specific steps illustrated in FIG. 10 provide a particular method of edge loop selection in computer graphics according to some embodiments. Other sequences of steps can also be performed according to alternative embodiments. For example, alternative embodiments of the present invention can perform the steps outlined above in a different order. Moreover, the individual steps illustrated in FIG. 10 can include multiple sub-steps that can be performed in various sequences as appropriate to the individual step. Furthermore, additional steps can be added or removed depending on the particular applications. One of ordinary skill in the art would recognize many variations, modifications, and alternatives.

According to some embodiments, a smart edge loop selection algorithm can also be invoked by selecting two edges connected by a standard four-way intersection. In such cases, no hint can be provided as how to process non-standard intersections. The examples below illustrate how the smart edge loop selection algorithms can work without a hint according to some embodiments.

Figure 11A:
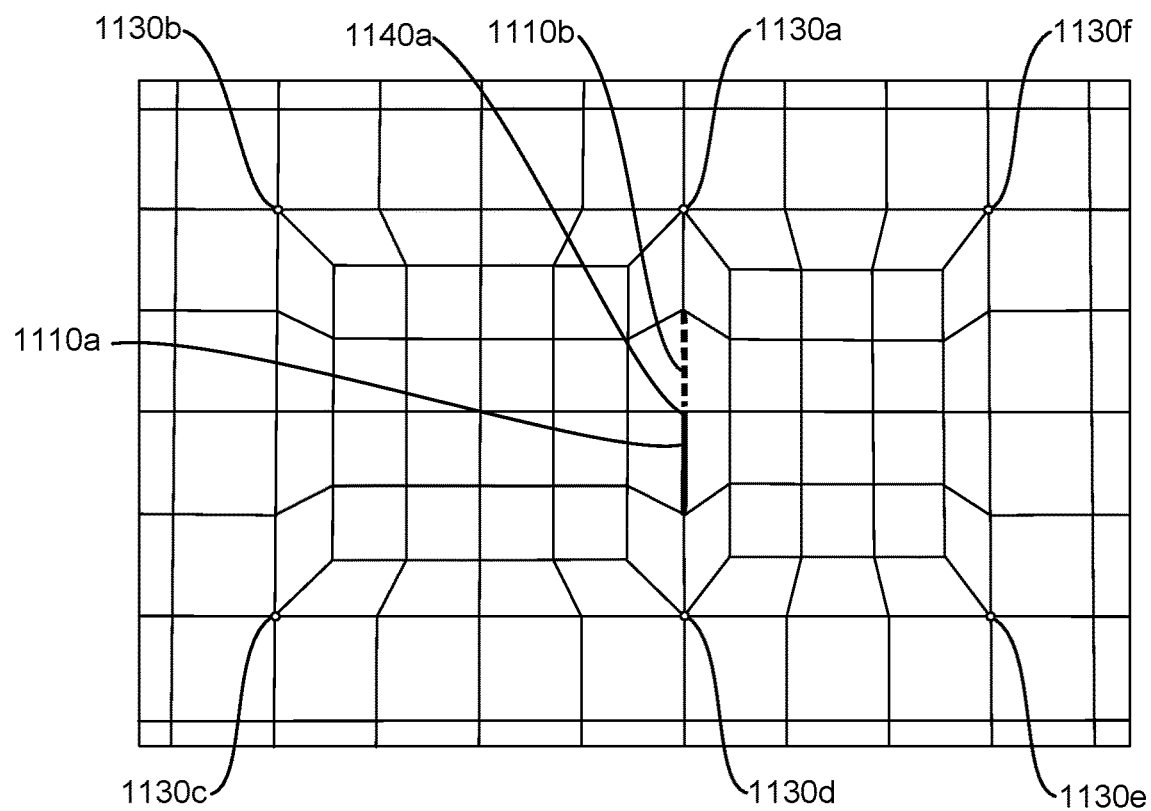
FIGS. 11A-11H illustrate a smart edge loop selection without a hint according to some embodiments.

FIGS. 11A-11H illustrate a smart edge loop selection without a hint according to some embodiments. In this polygon mesh, there are a number of non-standard intersection vertices, e.g., six-way intersection vertices 1130a and 1130d, and five-way intersection vertices 1130b, 1130c, 1130e, and 1130f, as illustrated in FIG. 11A. An artist can select a first edge 1110a and a second edge 1110b connected to the first edge 1110a. Note that the first edge 1110a and the second edge 1110b are connected to each other by a standard four-way intersection vertex 1140a, instead of a non-four-way intersection vertex. Thus, the smart edge loop selection algorithm is not given a hint as how to process a non-four-way intersection vertex.

Figure 11B:
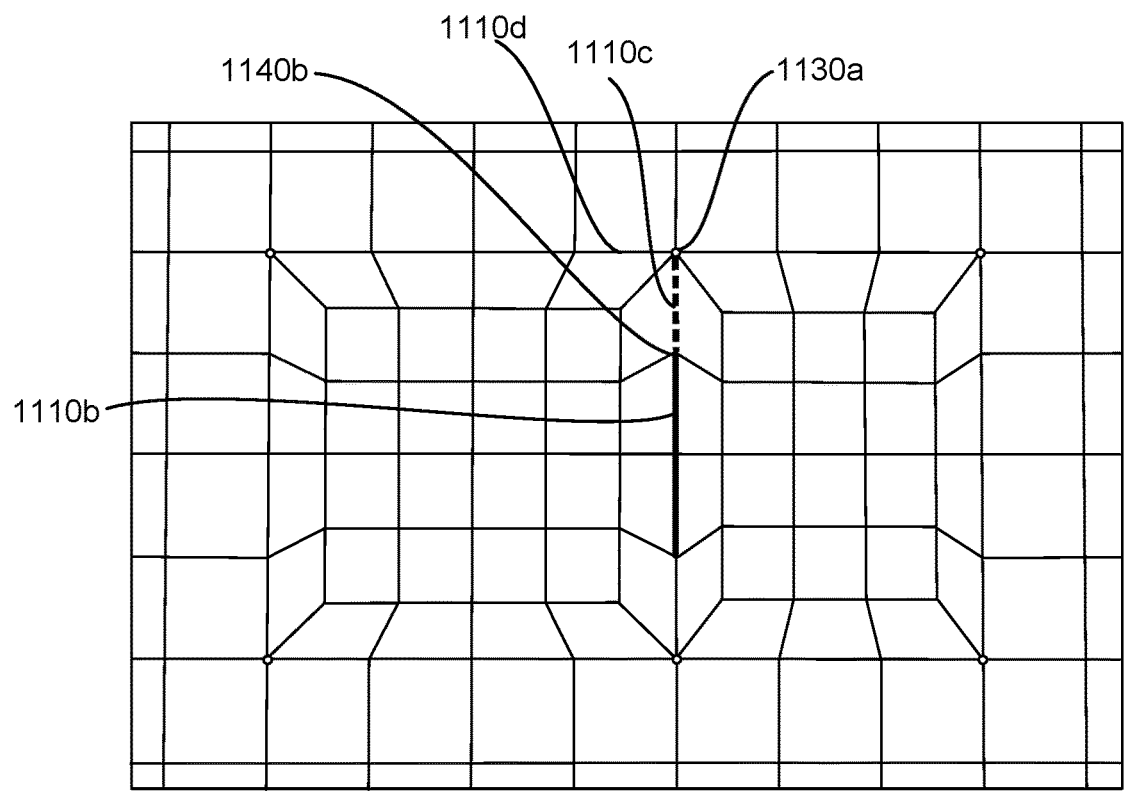
Figure 11C:
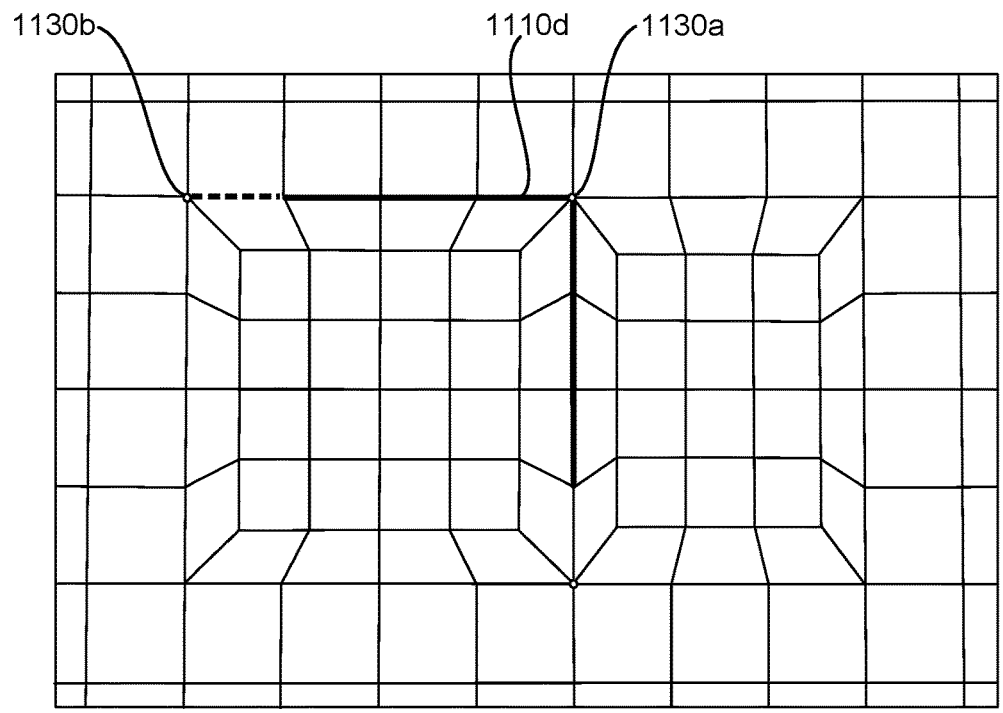
Figure 11D:
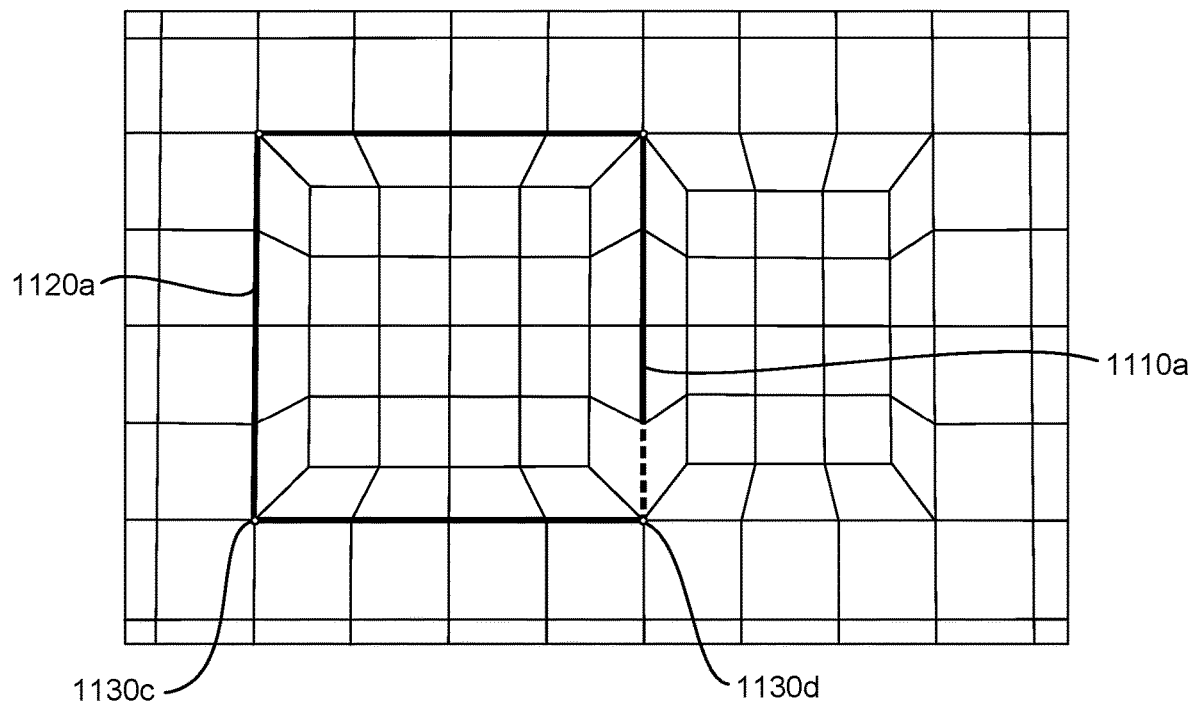

Once the smart edge loop selection algorithm is invoked, the algorithm can, from the second edge 1110b, choose the middle edge 1110c at the four-way intersection vertex 1140b, as illustrated in FIG. 11B. It then encounters the six-way intersection vertex 1130a. Because the algorithm is given no hint as how to process a non-four-way intersection vertex, the algorithm can process the six-way intersection vertex 1130a according to a default rule. In some embodiments, the default rule can be to skip one edge on the left side when processing an intersection that has five or more edges connected thereto. Thus, as illustrated in FIG. 11C, the algorithm chooses the edge 1110d as the next edge. The algorithm then processes each of following four-way intersection vertices by choosing the middle edge at each of them, until it next encounters the five-way intersection 1130b, as illustrated in FIG. 11C. At that point, the algorithm again processes the five-way intersection 1130b by following the default rule of skipping one edge on the left side, as illustrated in FIG. 11D. The algorithm proceeds in this fashion through the five-way intersection 1130c and the six-way intersection 1130d until it meets the first edge 1110a, thus completing the entire edge loop 1120a, as illustrated in FIG. 11D.

Figure 11E:
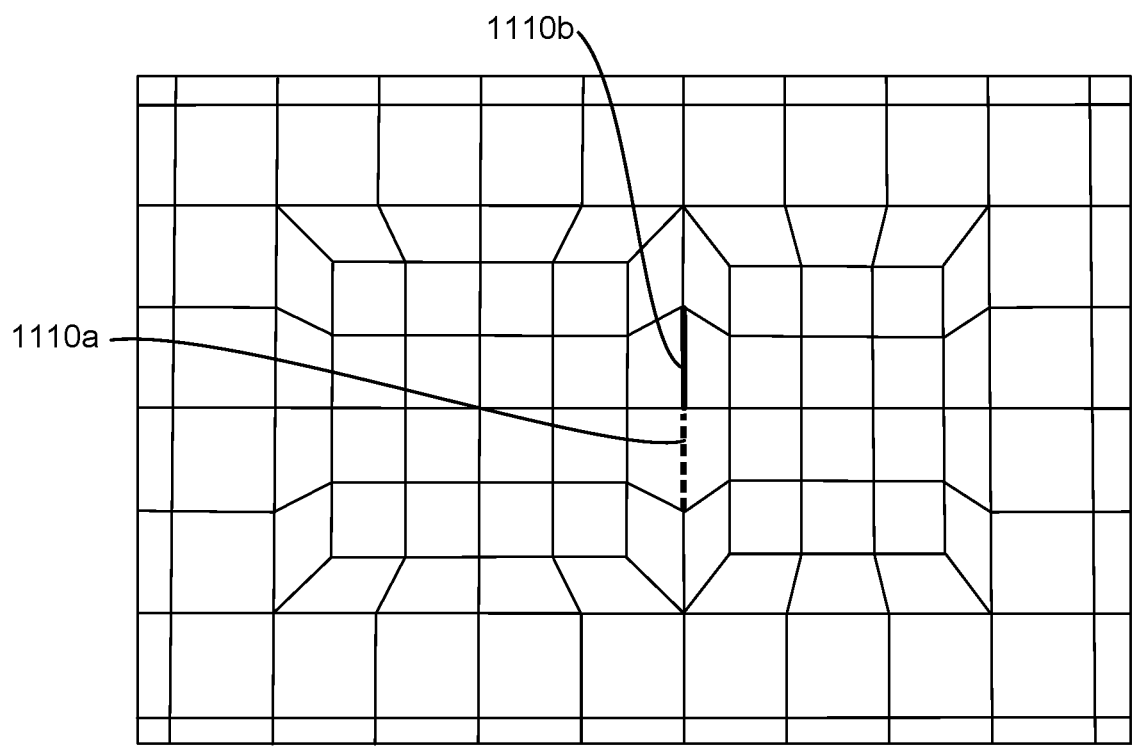
Figure 11F:
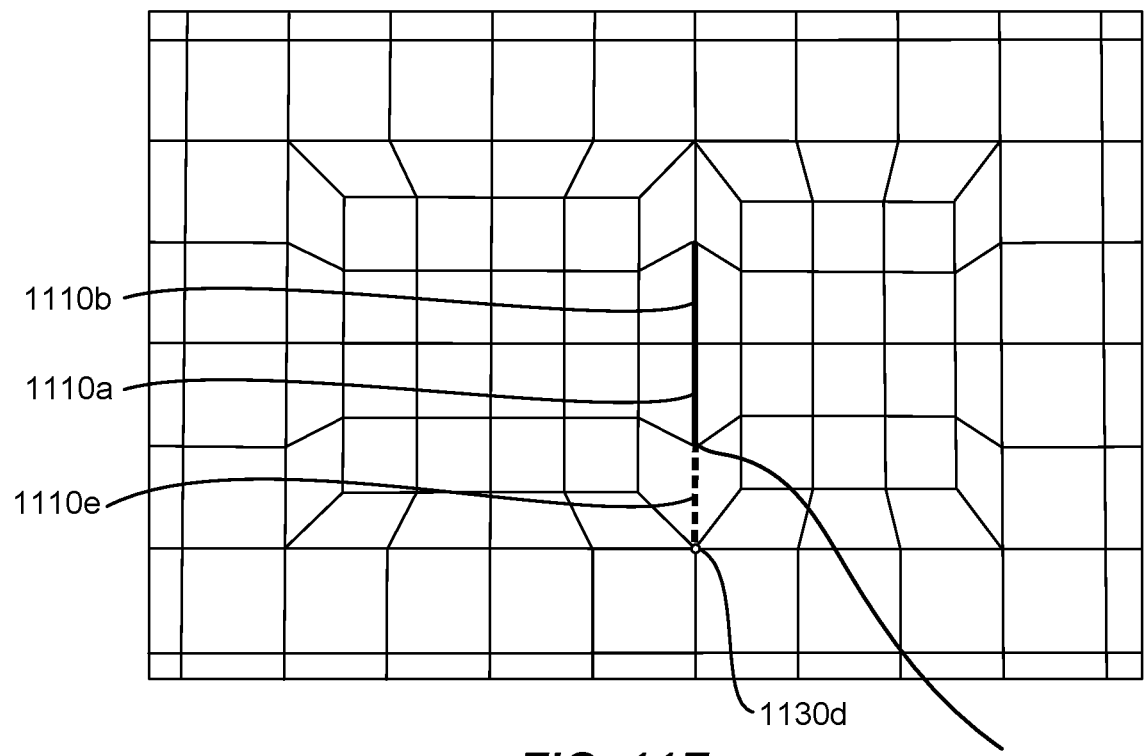

In cases in which no hint is given, the order that the two initial edges are selected can make a difference to the final result of the edge loop selection. FIGS. 11E-11H illustrate what the final result would be if the order that the two initial edges 1110a and 1110b are selected is reversed. As illustrated in FIG. 11E, the first edge being selected is the edge 1110b, and the second edge being selected is the edge 1110a. After the smart edge loop selection algorithm is invoked, the algorithm can, from the second edge 1110a, choose the middle edge 1110e as the next edge at the four-way intersection vertex 1140c, as illustrated in FIG. 11F. It then encounters the six-way intersection vertex 1130d.

Figure 11G:
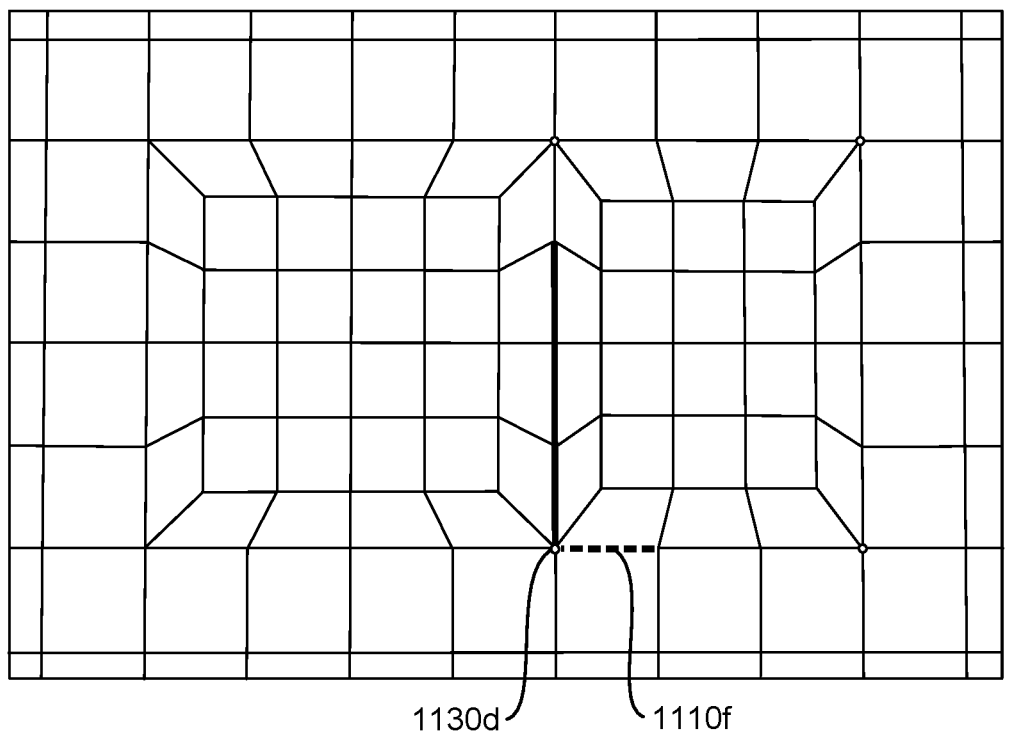
Figure 11H:
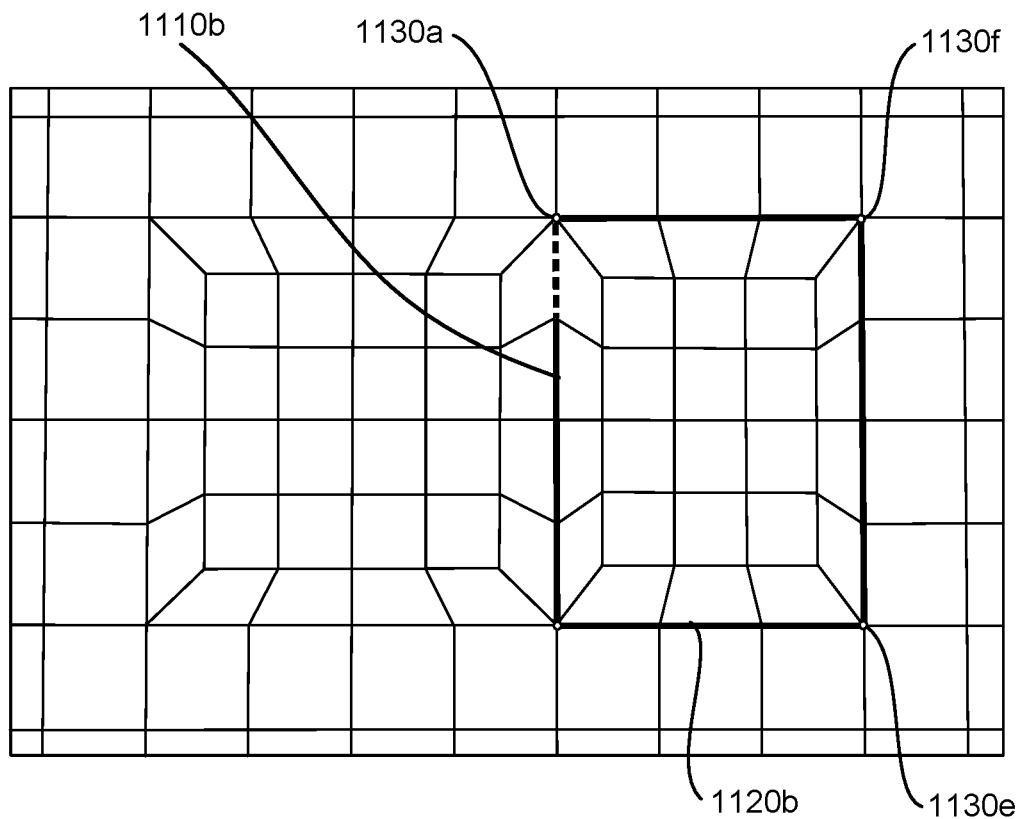

At that point, the algorithm processes the six-way intersection 1130d by following the default rule of skipping one edge on the left side and chooses the edge 1110f, as illustrated in FIG. 11G. As illustrated in FIG. 11H, the algorithm proceeds in this fashion through the following non-standard intersections 1130e, 1130f, and 1130a until it meets the first edge 1110b, thus completing the entire edge loop 1120b. Compared to edge loop 1120a shown in FIG. 11D, a different edge loop 1120b is achieved in this case.

It should be understood that other types of default decisions are also possible when no hint is provided to the smart edge loop selection algorithm as how to process a non-four-way intersection. For example, the default decision can be to skip two edges on the left side. One of ordinary skill in the art would recognize many variations, alternatives, and modifications.

Figure 12A:
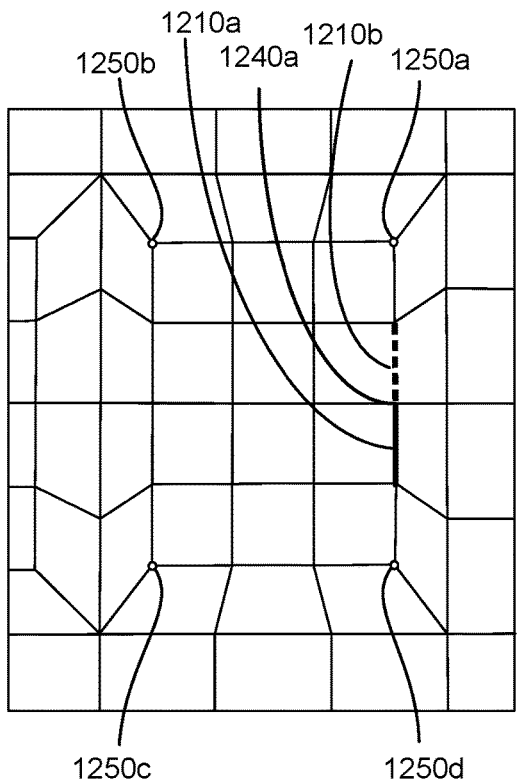
FIGS. 12A-12E illustrate a smart edge loop selection without a hint when three-way intersections are encountered according to some embodiments.

FIGS. 12A-12E illustrate a smart edge loop selection without a hint when three-way intersections are encountered according to some embodiments. In this polygon mesh, there are a number of three-way intersection vertices 1250a-1250d, as illustrated in FIG. 12A. An artist can select a first edge 1210a and a second edge 1210b connected to the first edge 1210a. Here again, the first edge 1210a and the second edge 1210b are connected to each other by a standard four-way intersection vertex 1240a, instead of a non-four-way intersection vertex. Thus, the smart edge loop selection algorithm is not given a hint as how to process a non-four-way intersection vertex.

Figure 12B:
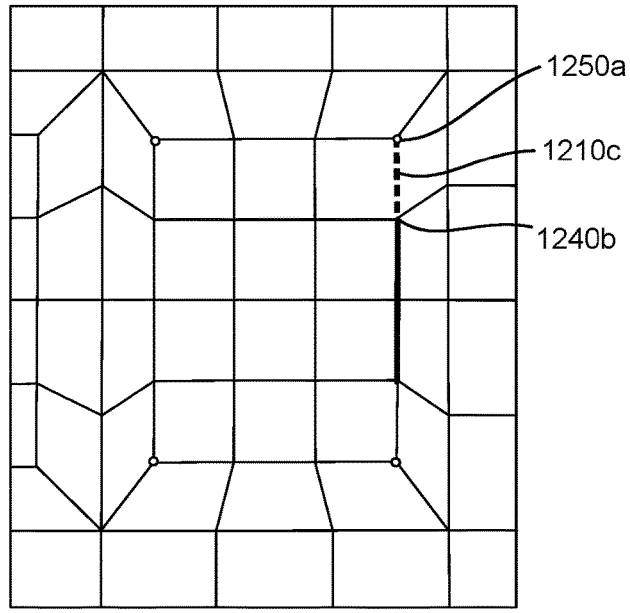
Figure 12C:
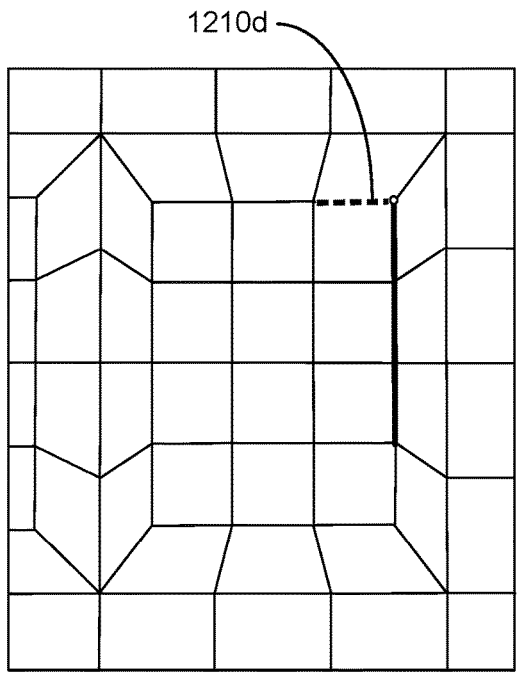
Figure 12D:
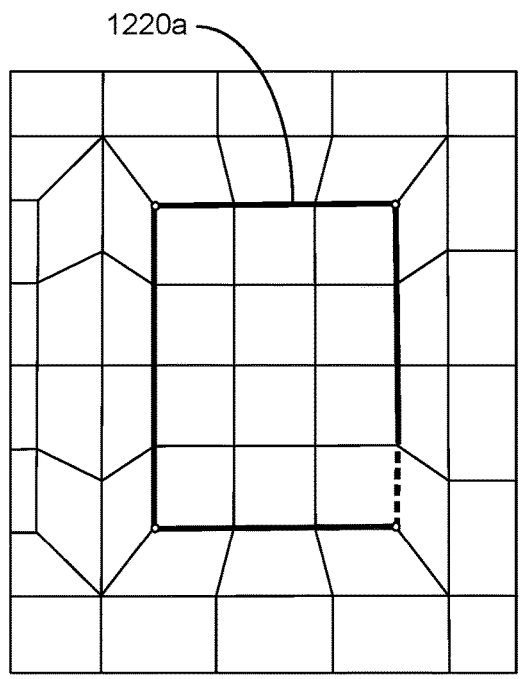

After the smart edge loop selection algorithm is invoked, the algorithm would, from the second edge 1210b, choose the middle edge 1210c at the four-way intersection vertex 1240b, as illustrated in FIG. 12B. It then encounters the non-standard three-way intersection vertex 1250a. Because the algorithm is given no hint as how to process a non-four-way intersection vertex, the algorithm can proceed according to a default rule. In some embodiments, the default rule can be to skip no edge and choose the first edge on the left side when processing a three-way intersection. Thus, as illustrated in FIG. 12C, the next edge to be chosen is 1210d. The algorithm can then process the other three-way intersections 1250b-1250d by following the same default rule. Thus, a final edge loop 1220a illustrated in FIG. 12D can be achieved.

Figure 12E:
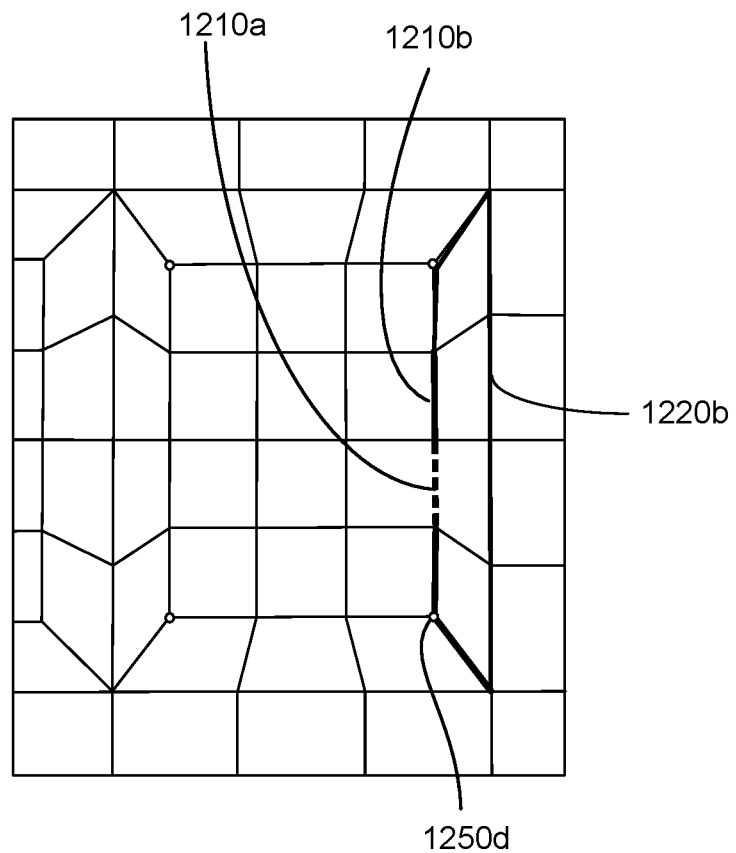

In this example, the order that the first edge and the second edge are selected can also make a different in the final result achieved. For example, if the first edge being selected is the edge 1210b and the second edge being selected is the edge 1210a, the final edge loop 1220b can be achieved as illustrated in FIG. 12E.

In some embodiments, a smart edge loop selection algorithm can process non-standard intersections (i.e., non-four-way intersections) according to the following default rule. If the first encountered non-standard intersection vertex has three edges connected thereto (i.e., a three-way intersection), the smart edge loop selection algorithm can process the first encountered non-standard intersection vertex and all future non-standard intersection vertices by skipping no edge on the left side. If the first encountered non-standard intersection vertex has five or more edges connected thereto, the smart edge loop selection algorithm can process the first non-standard intersection vertex and all future non-standard intersection vertices by skipping one edge on the left side.

According to some other embodiments, a smart edge loop selection algorithm can process non-standard intersections (i.e., non-four-way intersections) according to the following default rule. If the first encountered non-standard intersection vertex has three edges connected thereto, the smart edge loop selection algorithm can process the first encountered non-standard intersection vertex and all future non-standard intersection vertices by skipping no edge on the right side. If the first encountered non-standard intersection vertex has five or more edges connected thereto, the smart edge loop selection algorithm can process the first non-standard intersection vertex and all future non-standard intersection vertices by skipping one edge on the right side.

In some embodiments, a smart edge loop selection algorithm can process non-standard intersections (i.e., non-four-way intersections) according to the following default rule: processing all non-standard intersections with an even number of edges connected thereto by choosing the middle edge as the next edge.

In some embodiments, if the two edges initially selected are connected to each other by a vertex that has an even number (N) of edges connected thereto (not including standard four-way intersection vertices), and the hint provided by the two initial edges is such that the number of edges to be skipped (either on the left side or on the right side) is $$M = \frac{N}{2} - 1,$$

(i.e., the middle edge is chosen) the smart edge loop selection algorithm can process future intersections according to the following rule(s): when encountering all future "even" intersections, re-computing $$M' = \frac{N'}{2} - 1,$$

wherein N' is the number of edges connected to the current "even" intersection, and skipping M' number of edges (either on the left side or on the right side); and for all other non-standard intersections (i.e., "odd" intersections), follow the default rule as in the "no hint" situations described above.

For example, if N=6 and M=2, the smart edge loop selection algorithm can skip two edges on the left side (or on the right side) at all future six-way intersections, and skip three edges on the left side (or on the right side) at all future eight-way intersections. Effectively, the rule according to the hint is such that the smart edge loop selection algorithm would choose the "middle" edge when encountering all future even-number intersections, as it normally does when encountering standard four-way intersections. If the first encountered non-standard, non-even-numbered intersection has five or more edges (5, 7, 9+), the smart edge loop selection algorithm would skip one edge on the left for this intersection and all future odd-numbered intersections. If the first encountered non-standard, non-even numbered intersection has three edges, the smart edge loop selection algorithm would skip no edge on the left for this intersection and all future odd-numbered intersections.

In some embodiments, if the two edges initially selected are connected to each other by a vertex that has an even number (N) of edges connected thereto and N is equal to eight or greater (e.g., N=8, 10, 12, etc.), and the hint provided by the two initial edges is such that the number (M) of edges to be skipped on the left side is between 2 and $$\frac{N}{2} - 2,$$

inclusive, the smart edge loop selection algorithm can process future non-standard intersections according to the following rule(s). For all future intersection vertices that have the same number (N) of edges connected thereto, skipping M number of edges on the left side. For all other non-standard intersections (e.g., "odd" intersections, and "even" intersections other than N-way and four-way intersections), if the first encountered non-standard intersection vertex has three edges connected thereto (i.e., a three-way intersection), the smart edge loop selection algorithm can process the first encountered non-standard intersection vertex and all future non-standard intersection vertices by skipping no edge on the left side; and if the first encountered non-standard intersection vertex has five or more edges connected thereto, the smart edge loop selection algorithm can process the first non-standard intersection vertex and all future non-standard intersection vertices by skipping one edge on the left side.

In some embodiments, if the two edges initially selected are connected to each other by a vertex that has an even number (N) of edges connected thereto and N is equal to eight or greater (e.g., N=8, 10, 12, etc.), and the hint provided by the two initial edges is such that the number (M) of edges to be skipped on the right side is between 2 and $$\frac{N}{2} - 2,$$

inclusive, the smart edge loop selection algorithm can process future non-standard intersections according to the following rule(s). For all future intersection vertices that have the same number (N) of edges connected thereto, skipping M number of edges on the right side. For all other non-standard intersections (e.g., "odd" intersections, and "even" intersections other than N-way and four-way intersections), if the first encountered non-standard intersection vertex has three edges connected thereto (i.e., a three-way intersection), the smart edge loop selection algorithm can process the first encountered non-standard intersection vertex and all future non-standard intersection vertices by skipping no edge on the right side; and if the first encountered non-standard intersection vertex has five or more edges connected thereto, the smart edge loop selection algorithm can process the first non-standard intersection vertex and all future non-standard intersection vertices by skipping one edge on the right side.

In some embodiments, if the two edges initially selected are connected to each other by a vertex that has an odd number (N) of edges connected thereto, where N is equal to seven or greater (e.g., N=7, 9, 11, etc.), and the hint provided by the two initial edges is such that the number of edges to be skipped on the left side is M, where M is between 2 and $$\frac{N}{2} - 1,$$

inclusive, the smart edge loop selection algorithm can process future non-standard intersections according to the following rule(s). For all future intersection vertices that have the same number (N) of edges connected thereto, skipping M number of edges on the left side. For all other non-standard intersections (e.g., "even" intersections, and "odd" intersections other than N-way intersections), if the first encountered non-standard intersection vertex has three edges connected thereto (i.e., a three-way intersection), the smart edge loop selection algorithm can process the first encountered non-standard intersection vertex and all future non-standard intersection vertices by skipping no edge on the left side; and if the first encountered non-standard intersection vertex has five or more edges connected thereto, the smart edge loop selection algorithm can process the first non-standard intersection vertex and all future non-standard intersection vertices by skipping one edge on the left side.

In some embodiments, if the two edges initially selected are connected to each other by a vertex that has an odd number (N) of edges connected thereto, where N is equal to seven or greater (e.g., N=7, 9, 11, etc.), and the hint provided by the two initial edges is such that the number of edges to be skipped on the right side is M, where M is between 2 and $$\frac{N}{2}-1,$$

inclusive, the smart edge loop selection algorithm can process future non-standard intersections according to the following rule(s). For all future intersection vertices that have the same number (N) of edges connected thereto, skipping M number of edges on the right side. For all other non-standard intersections (e.g., "even" intersections, and "odd" intersections other than N-way intersections), if the first encountered non-standard intersection vertex has three edges connected thereto (i.e., a three-way intersection), the smart edge loop selection algorithm can process the first encountered non-standard intersection vertex and all future non-standard intersection vertices by skipping no edge on the right side; and if the first encountered non-standard intersection vertex has five or more edges connected thereto, the smart edge loop selection algorithm can process the first non-standard intersection vertex and all future non-standard intersection vertices by skipping one edge on the right side.

Figure 13:
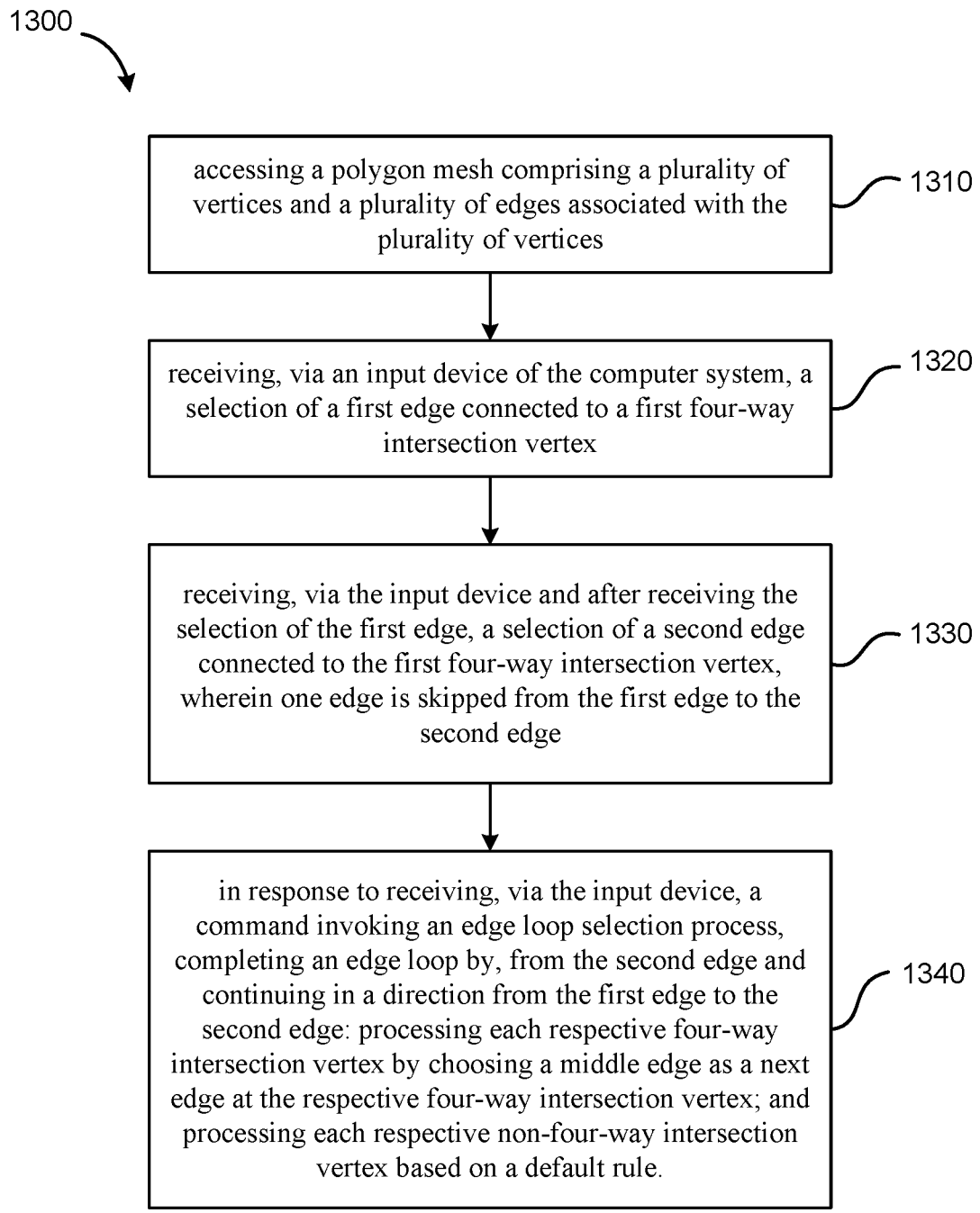
FIG. 13 shows a simplified flowchart illustrating a method of edge loop selection according to some embodiments.

FIG. 13 shows a simplified flowchart illustrating a method 1300 of edge loop selection in computer graphics performed by a computer system according to some embodiments.

The method 1300 includes, at 1310, accessing a polygon mesh. The polygon mesh includes a plurality of vertices and a plurality of edges associated with the plurality of vertices.

The method 1300 further includes, at 1320, receiving, via an input device of the computer system, a selection of a first edge connected to a first four-way intersection vertex; and at 1330, receiving, via the input device and after receiving the selection of the first edge, a selection of a second edge connected to the first four-way intersection vertex. Wherein one edge is skipped from the first edge to the second edge.

The method 1300 further includes, at 1340, in response to receiving, via the input device, a command invoking an edge loop selection process, completing an edge loop by, from the second edge and continuing in a direction from the first edge to the second edge: processing each respective four-way intersection vertex by choosing a middle edge as a next edge at the respective four-way intersection vertex; and processing each respective non-four-way intersection vertex based on a default rule.

It should be appreciated that the specific steps illustrated in FIG. 13 provide a particular method of edge loop selection in computer graphics according to some embodiments. Other sequences of steps can also be performed according to alternative embodiments. For example, alternative embodiments of the present invention can perform the steps outlined above in a different order. Moreover, the individual steps illustrated in FIG. 13 can include multiple sub-steps that can be performed in various sequences as appropriate to the individual step. Furthermore, additional steps can be added or removed depending on the particular applications. One of ordinary skill in the art would recognize many variations, modifications, and alternatives.

Figure 14:
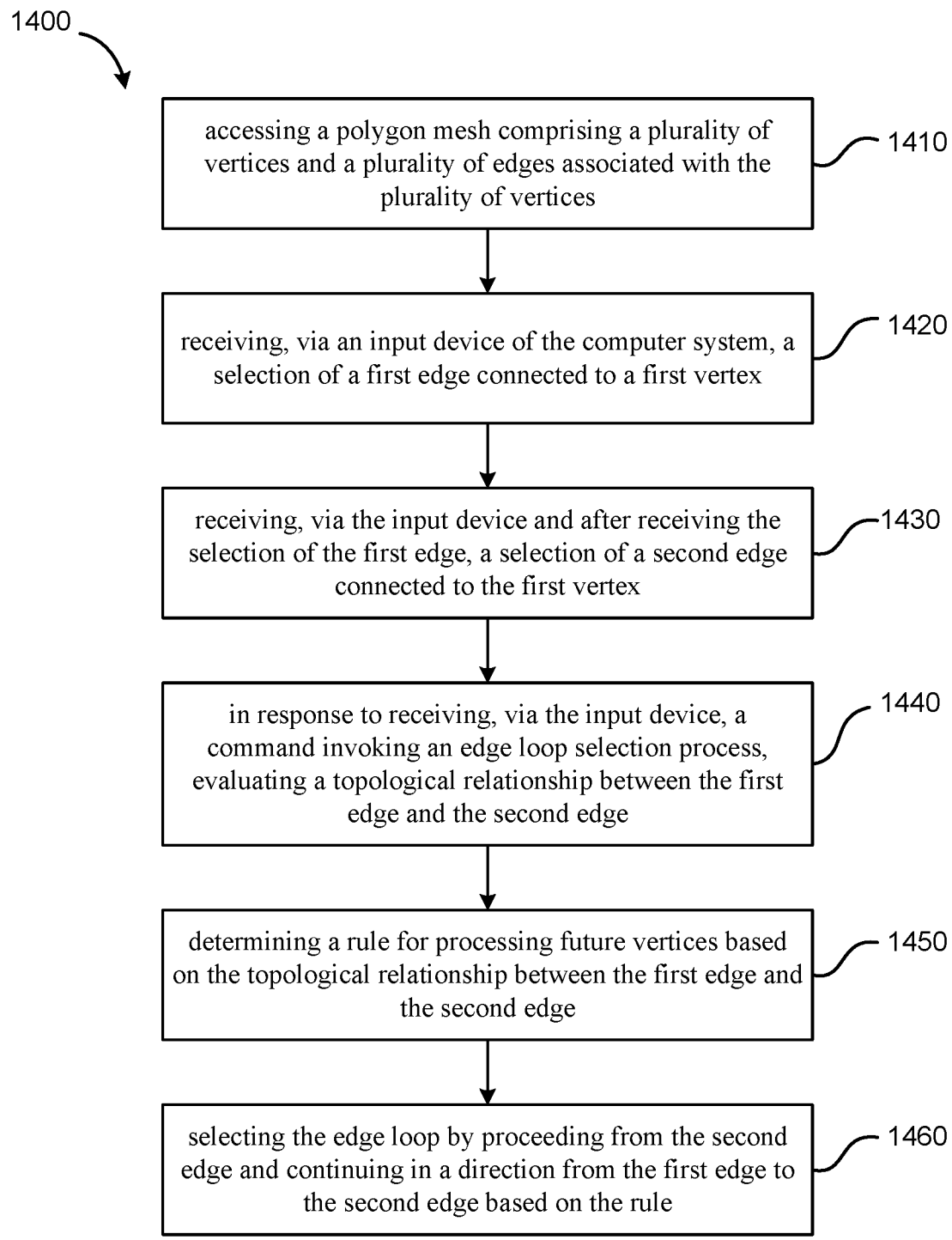
FIG. 14 shows a simplified flowchart illustrating a method of edge loop selection in computer graphics performed by a computer system according to some embodiments.

FIG. 14 shows a simplified flowchart illustrating a method 1400 of edge loop selection in computer graphics performed by a computer system according to some embodiments.

The method 1400 includes, at 1410, accessing a polygon mesh. The polygon mesh includes a plurality of vertices and a plurality of edges associated with the plurality of vertices.

The method 1400 further includes, at 1420, receiving, via an input device of the computer system, a selection of a first edge connected to a first vertex; and at 1430, receiving, via the input device and after receiving the selection of the first edge, a selection of a second edge connected to the first vertex.

The method 1400 further includes, in response to receiving, at 1440, via the input device, a command invoking an edge loop selection process: evaluating a topological relationship between the first edge and the second edge; and at 1450, determining a rule of how to process future vertices based on the topological relationship between the first edge and the second edge.

The method 1400 further includes, at 1460, selecting the edge loop by proceeding from the second edge and continuing in a direction from the first edge to the second edge based on the rule.

It should be appreciated that the specific steps illustrated in FIG. 14 provide a particular method of edge loop selection in computer graphics according to some embodiments. Other sequences of steps can also be performed according to alternative embodiments. For example, alternative embodiments of the present invention can perform the steps outlined above in a different order. Moreover, the individual steps illustrated in FIG. 14 can include multiple sub-steps that can be performed in various sequences as appropriate to the individual step. Furthermore, additional steps can be added or removed depending on the particular applications. One of ordinary skill in the art would recognize many variations, modifications, and alternatives.

Figure 15:
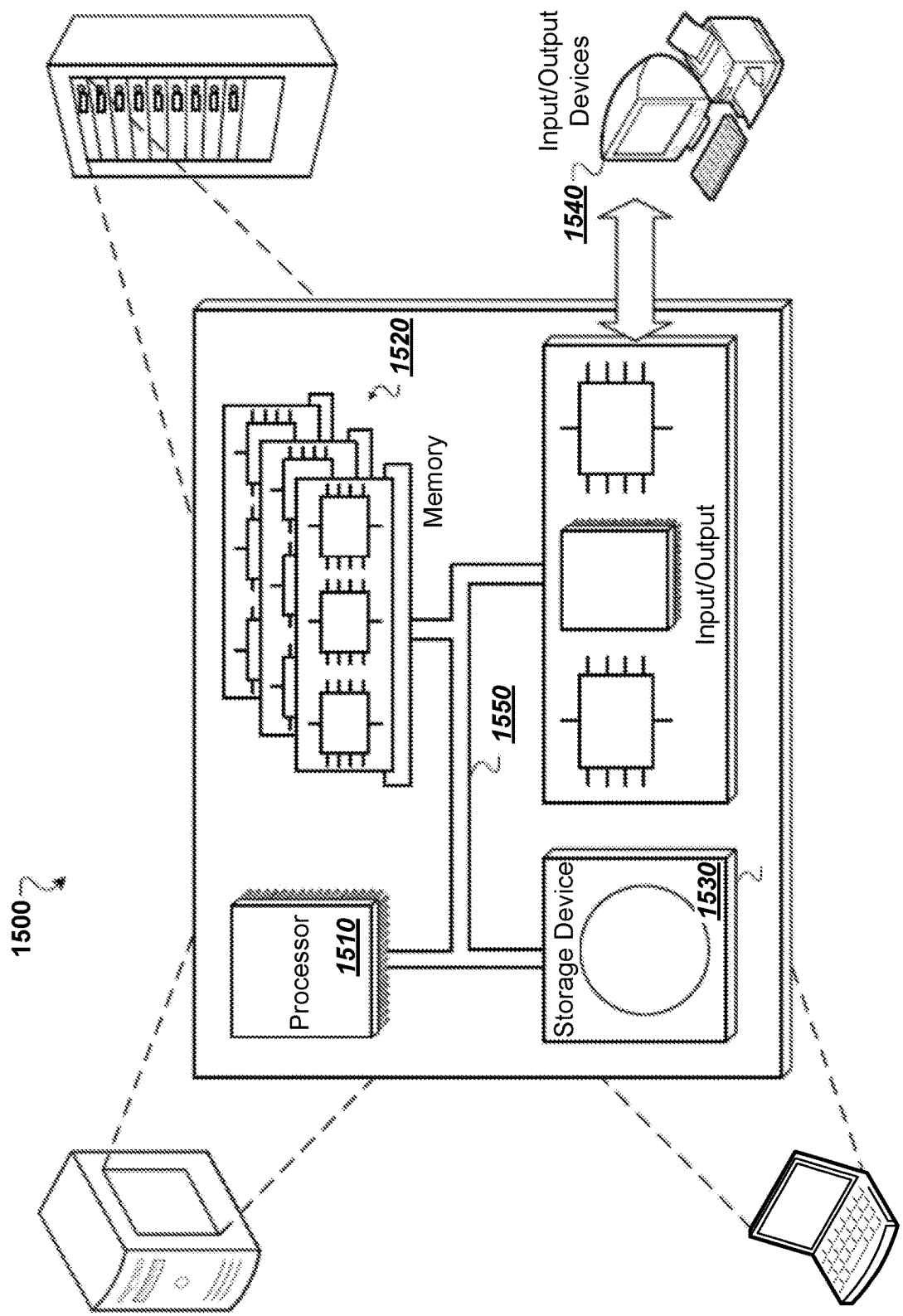
FIG. 15 shows a schematic diagram of an example of a computer system.

FIG. 15 shows a schematic diagram of an example of a computer system 1500. The computer system 1500 is exemplary only and one having skill in the art will recognize that variations and modifications are possible. The system 1500 can be used for the operations described in association with the processes of FIGS. 10, 13, and 14.

The system 1500 includes a processor 1510, a memory 1520, a storage device 1530, and an input/output device 1540. Each of the components 1510, 1520, 1530, and 1540 are interconnected using a system bus 1550. The processor 1510 is capable of processing instructions for execution within the system 1500. In one implementation, the processor 1510 is a single-threaded processor. In another implementation, the processor 1510 is a multi-threaded processor. The processor 1510 is capable of processing instructions stored in the memory 1520 or on the storage device 1530 to perform the steps of processes according to the present invention.

The memory 1520 stores information within the system 1500 and can be associated with various characteristics and implementations. For example, the memory 1520 can include various types of computer-readable medium such as volatile memory, a non-volatile memory and other types of memory technology, individually or in combination.

The storage device 1530 is capable of providing mass storage for the system 1500. In one implementation, the storage device 1530 is a computer-readable medium. In various different implementations, the storage device 1530 can be a floppy disk device, a hard disk device, an optical disk device, or a tape device.

The input/output device 1540 provides input/output operations for the system 1500. In one implementation, the input/output device 1540 includes a keyboard, pointing device, touchscreen display, and/or the like. In another implementation, the input/output device 1540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), LED (light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system 1500 can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of edge loop selection in computer graphics performed by a computer system, the method comprising:
    accessing a polygon mesh comprising a plurality of vertices and a plurality of edges associated with the plurality of vertices;
    receiving, via an input device of the computer system, a selection of a first edge connected to a first non-four-way intersection vertex;
    receiving, via the input device and after receiving the selection of the first edge, a selection of a second edge connected to the first non-four-way intersection vertex; and
    in response to receiving, via the input device, a command invoking an edge loop selection process:
        determining a number of edge(s) that is skipped from the first edge to the second edge on a left side or on a right side;
        determining a rule for selecting a next edge at a non-four-way intersection vertex based on the number of edge(s) that is skipped from the first edge to the second edge on a left side or on a right side; and
        completing an edge loop by, from the second edge and continuing in a direction from the first edge to the second edge:
            at each respective four-way intersection vertex, selecting a middle edge as the next edge at the respective four-way intersection vertex; and
        at each respective non-four-way intersection vertex, selecting the next edge based on the rule;
    wherein the rule comprises:
    upon determining that the first non-four-way intersection vertex has N number of edges connected thereto, N being an even integer, and the number of edge(s) that is skipped from the first edge to the second edge is equal to $$M = \frac{N}{2} - 1,$$

processing all future non-four-way intersection vertices that have an even number of edges connected thereto by choosing a middle edge.

2. The method of claim 1, wherein the rule further comprises:
    upon encountering a first future non-four-way intersection vertex that has an odd number of edges connected thereto, and upon determining that the first future non-four-way intersection vertex has three edges connected thereto, processing the first future non-four-way intersection and all other future non-four-way intersection vertices that have an odd number of edges connected thereto by skipping no edge on the left side; and
    upon encountering the first future non-four-way intersection vertex that has an odd number of edges connected thereto, and upon determining that the first future non-four-way intersection vertex has five or more edges connected thereto, processing the first future non-four-way intersection vertex and all other future non-four-way intersection vertices that have an odd number of edges connected thereto by skipping one edge on the left side.

3. The method of claim 1, wherein the selection of the second edge and the command invoking the edge loop selection process are made by clicking or double-clicking the second edge, or by entering a key combination, or by hovering a mouse over the second edge and selecting an item in a pop-up menu.

4. A method of edge loop selection in computer graphics performed by a computer system, the method comprising:
  accessing a polygon mesh comprising a plurality of vertices and a plurality of edges associated with the plurality of vertices;
  receiving, via an input device of the computer system, a selection of a first edge connected to a first non-four-way intersection vertex;
  receiving, via the input device and after receiving the selection of the first edge, a selection of a second edge connected to the first non-four-way intersection vertex; and
  in response to receiving, via the input device, a command invoking an edge loop selection process:
    determining a number of edge(s) that is skipped from the first edge to the second edge on a left side or on a right side;
    determining a rule for selecting a next edge at a non-four-way intersection vertex based on the number of edge(s) that is skipped from the first edge to the second edge on a left side or on a right side; and
    completing an edge loop by, from the second edge and continuing in a direction from the first edge to the second edge:
      at each respective four-way intersection vertex, selecting a middle edge as the next edge at the respective four-way intersection vertex; and
      at each respective non-four-way intersection vertex, selecting the next edge based on the rule;
  wherein the rule comprises:
  upon determining that the first non-four-way intersection vertex has N number of edges connected thereto, N being an even integer equal to or greater than eight, and the number of edge(s) that is skipped from the first edge to the second edge is equal to M, M being between 2 and $$\frac{N}{2} - 2,$$

inclusive, processing all future non-four-way intersection vertices that have N number of edges connected thereto by skipping M number of edges on the left side or on the right side.

5. The method of claim 4, wherein the rule further comprises:
  upon encountering a first future non-four-way intersection vertex that has L number of edges connected thereto and L is not equal to N, and upon determining that L is equal to three, processing the first future non-four-way intersection vertex and all other future non-four-way intersection vertices that have a number of edges connected thereto that is not equal to N by skipping no edge on the left side or the right side; and
  upon encountering the first future non-four-way intersection vertex that has L number of edges connected thereto and L is not equal to N, and upon determining that L is equal to or greater than five, processing the first future non-four-way intersection vertex and all other future non-four-way intersection vertices that have a number of edges connected thereto that is not equal to N by skipping one edge on the left side or the right side.

6. A method of edge loop selection in computer graphics performed by a computer system, the method comprising:
  accessing a polygon mesh comprising a plurality of vertices and a plurality of edges associated with the plurality of vertices;
  receiving, via an input device of the computer system, a selection of a first edge connected to a first non-four-way intersection vertex;
  receiving, via the input device and after receiving the selection of the first edge, a selection of a second edge connected to the first non-four-way intersection vertex; and
  in response to receiving, via the input device, a command invoking an edge loop selection process:
    determining a number of edge(s) that is skipped from the first edge to the second edge on a left side or on a right side;
    determining a rule for selecting a next edge at a non-four-way intersection vertex based on the number of edge(s) that is skipped from the first edge to the second edge on a left side or on a right side; and
    completing an edge loop by, from the second edge and continuing in a direction from the first edge to the second edge:
      at each respective four-way intersection vertex, selecting a middle edge as the next edge at the respective four-way intersection vertex; and
      at each respective non-four-way intersection vertex, selecting the next edge based on the rule;
  wherein the rule comprises:
  upon determining that the first non-four-way intersection vertex has N number of edges connected thereto, N being an odd integer that is equal to or greater than seven, and the number of edge(s) that is skipped from the first edge to the second edge is equal to M, M being between 2 and $$\frac{N}{2} - 1,$$

inclusive, processing all non-four-way intersection vertices that have N number of edges connected thereto by skipping M number of edges on the left side or on the right side.

7. The method of claim 6, wherein the rule further comprises:
  upon encountering a first future non-four-way intersection vertex that has L number of edges connected thereto and L is not equal to N, and upon determining that L is equal to three, processing all future non-four-way intersection vertices that have a number of edges connected thereto that is not equal to N by skipping no edge on the left side or the right side; and
  upon encountering the first future non-four-way intersection vertex that has L number of edges connected thereto and L is not equal to N, and upon determining that L is equal to or greater than five, processing all future non-four-way intersection vertices that have a number of edges connected thereto that is not equal to N by skipping one edge on the left side or the right side.

\* \* \* \* \*